United States Patent [19]

Katoh et al.

[11] Patent Number: 5,729,480
[45] Date of Patent: Mar. 17, 1998

[54] PORTABLE INFORMATION PROCESSING APPARATUS

[75] Inventors: Katsutoshi Katoh, Tokyo; Michio Suzuki, Yokohama, both of Japan

[73] Assignee: International Business Machine Corporation, Armonk, N.Y.

[21] Appl. No.: 673,867

[22] Filed: Jul. 2, 1996

[30] Foreign Application Priority Data

Sep. 20, 1995 [JP] Japan ................... 7-241102

[51] Int. Cl.⁶ ................... G06F 3/00; G06F 1/16
[52] U.S. Cl. ................... 364/709.12; 364/708.1; 361/680
[58] Field of Search ................... 364/708.1, 709.1, 364/709.12; 361/680, 729

[56] References Cited

U.S. PATENT DOCUMENTS 5,168,427  12/1992  Clancy et al. ................... 361/380 X
5,490,036  2/1996  Lin et al. ................... 361/680
5,629,832  5/1997  Sellers ................... 361/680

*Primary Examiner*—Chuong Dinh Ngo
*Attorney, Agent, or Firm*—Daniel E. McConnell; George E. Grosser

[57] ABSTRACT

A portable information processing apparatus of the type which includes a main body, a keyboard unit that mounted on the top surface of the main body, and a lid pivotally attached to the rear end of the main body, wherein the improvement comprises: (a) a keyboard base of the keyboard unit for covering the top surface of the main body; (b) a keyboard portion of the keyboard unit which is attached to the front end of, and which is rotatable in a first direction; and (c) a lever of the keyboard unit, which is attached to the rear end of the keyboard base, and which is rotatable in a second direction opposite to the first direction, for holding the keyboard portion at a still position whereat the keyboard portion is tilted at a predetermined angle.

22 Claims, 18 Drawing Sheets

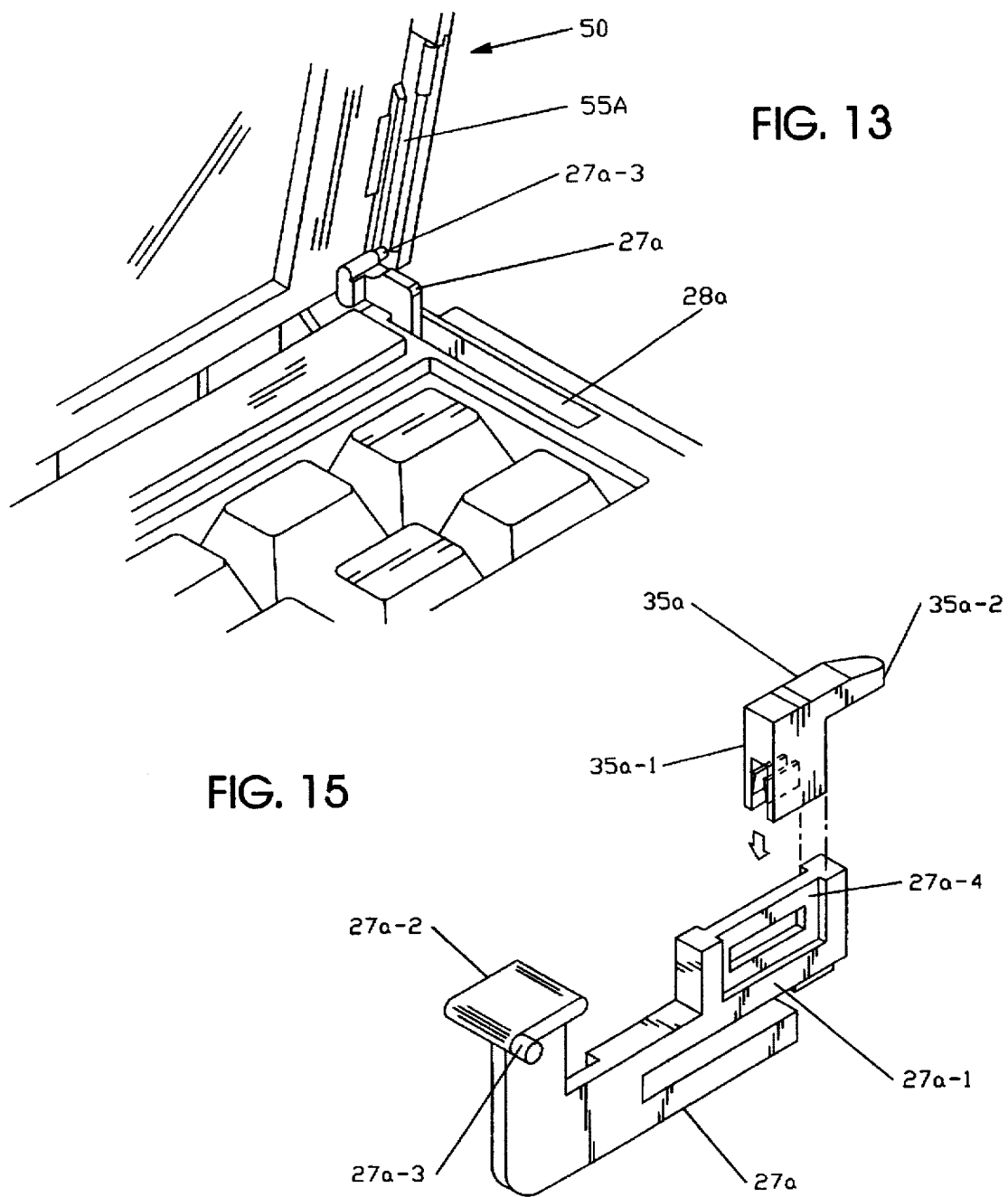

PORTABLE INFORMATION PROCESSING APPARATUS

BACKGROUND OF THE INVENTION

The present invention relates to a portable information processing apparatus, such as a notebook computer, that is so designed and manufactured that it is thin and compact, and in particular relates to a portable information processing apparatus having a lid, in which, on its inner side, is mounted a liquid crystal display panel, that is so coupled with a computer main body having a keyboard on its top surface that the lid can be freely opened and closed. More specifically, the present invention pertains to a portable information processing apparatus that has a lid and that includes a keyboard tilting mechanism by which a keyboard can be tilted at any desired angle for improved usability.

In accordance with current technical development, various types of personal computers (hereinafter also referred to as "PCs"), such as desktop and notebook types, are manufactured and widely sold on the market. Notebook PCs, for which portability is a major design consideration, are so designed and manufactured that they are thin and compact.

The most popular form employed for a notebook PC is a "structure with a lid", wherein a PC main body, which has a keyboard unit on its top surface, is so coupled with a lid by a hinge at its rear edge, for protecting the keyboard, that the lid can be freely opened and closed. The main body includes internally a system board and peripheral devices, (such as an HDD, a CD-ROM drive and a PC Card). Fixed in the center of the inner face of the lid is a recessed liquid crystal display (LCD) panel that serves as a display device when the lid is open (i.e., when the PC is in use). The notebook PC with a lid is used with the lid open and the keyboard and the panel exposed. When the lid is closed, the keyboard and the panel are stored internally and are protected from being struck accidentally while the PC is not being used (is being carried or is stored).

Some notebook PCs are so structured that a keyboard unit mounted on a main body may be either open (a condition known as "keyboard open") or closed relative to the case of the main body. The main reason the keyboard unit is so provided that it can be opened and closed is to facilitate the exchange of peripheral devices and a battery pack mounted within the main body. For example, the "ThinkPad 750/755" and the "ThinkPad Power Series 820/850" ("ThinkPad" is a trademark of IBM Corp.), which are sold by IBM Japan, Ltd., have keyboard units that are coupled with PC main bodies by hinges at their rear edges, so that the units can be opened and closed relative to the PC main bodies. In other words, a keyboard unit serves as a lid of a PC main body case.

One current trend in the development of notebook PCs involves the improvement of their portability by further reducing their size and thickness. Reductions in size and weight are achieved by developing enhanced integration techniques for electric circuits and by reducing the sizes of peripheral devices. In other words, other functions of PCs are sacrificed for the reductions in size and thickness. For example, the volumes and shapes of the peripheral devices mounted in a PC and the number of these devices are very limited because of the trend to reduce in the sizes and thicknesses of PCs. From the view point of usability (or human engineering), keyboards should be so tilted that their front sides are low and their rear sides are high (see Japanese Unexamined Patent Publication No. Hei 03-10307, FIG. 3, for example), but keyboards are not so tilted because to do so would require that they be constructed extra thick.

The space restrictions that affect peripheral devices can be easily compensated by installing them externally, or by connecting them to a port applicator (a so-called "docking station"). The restriction that affects the usability of the keyboard also may be compensated by adding a mechanism for tilting a keyboard (hereafter referred to as a "keyboard tilting mechanism").

In their selection of personal computers, users today take into consideration not only the performance of CPUs and LCDs, which are provided in computers as standard features, but also the matter of usability (the easy handling of a PC). PC makers, therefore, are competing to attain superiority in computer mechanisms.

The above described keyboard tilting mechanism for tilting a keyboard is one of the ideas that can contribute to the superiority of a machine. Various keyboard tilting mechanisms have been proposed, as in, for example, Japanese Unexamined Patent Publications No. Hei 05-100770, Hei 03-240114, Hei 03-10307 and Hei 05-119885, and Japanese Unexamined Utility Model Publications No. Hei 05-30934, Hei 04-101132, and Hei 04-28326.

In Japanese Unexamined Patent Publications No. Hei 05-100770, Hei 03-240114 and Hei 03-10307, and Japanese Unexamined Utility Model Publications No. Hei 05-30934, Hei 04-101132, and Hei 04-28326 are disclosed a keyboard tilting mechanism whereby the rear of a keyboard unit that is provided flatly on the top surface of a PC main body is moved up and down, interlocked with the opening and closing operation of a lid member having a LCD panel. The type of keyboard tilting mechanism disclosed in these publications still seems to have the following shortcomings:

(1) Incorporation of a keyboard tilting mechanism in a PC main body.

At present as development continues to provide reductions in size and thickness, the interior of a PC main body is so well occupied by a system board and other components that there is very little space for storing additional components. The space saving in the main body is not discussed in the above described publications, even though the keyboard tilting mechanism and its operation are described by employing a PC with an empty case (for example, see FIG. 5 of Japanese Unexamined Patent Publication No. Hei 05-100770; FIGS. 3 and 11 of Japanese Unexamined Patent Publication No. Hei 03-240114; FIG. 2 of Japanese Unexamined Patent Publication No. Hei 03-10307; FIG. 1 of Japanese Unexamined Utility Model Publication No. Hei 05-30934; FIG. 3 of Japanese Unexamined Utility Model Publication No. Hei 04-101132; and FIG. 1 of Japanese Unexamined Utility Model Publication No. Hei 04-28326). That is, in the above referenced publications it is not obvious how the keyboard tilting mechanism should be implemented inside the main body, wherein the storage density for a system board and peripheral devices is already high.

(2) Interlocking of the keyboard tilting mechanism with the lid

The keyboard tilting mechanism described in the above publications includes a mechanism for transferring the movement produced by opening and closing operation of the lid. By simply opening the lid, therefore, the keyboard, whose displacement is interlocked with this movement, is tilted at a predetermined angle. When the lid is closed, the moving of the keyboard is also interlocked with this movement and is returned to its original flat state. The keyboard tilting mechanism disclosed in each of the publications is superior in that the keyboard tilting mechanism function needs no user's consciousness. However, the keyboard tilting mechanism is restricted by the mechanism for transmitting the opening and closing operation of the lid, and the tilted keyboard can not be freely returned to its original state while the lid is open. According, for example, to Japanese Unexamined Patent Publication No. Hei 05-100770, Japanese Unexamined Patent Publication No. Hei 03-240114 and Japanese Unexamined Utility Model Publication No. Hei 04-101132, the movement of the keyboard is limited because the keyboard is linked with the lid by a transmission system, such as a lever, a link, or an arm in such a manner that it can not be released from the lid. Further, in Japanese Unexamined Utility Model Publication No. Hei 05-30934, a pinion gear 2 can not disengage a rack gear 9. Even when a user prefers a flat positioned keyboard, a tilted keyboard is an irritation, and the keyboard tilting mechanism disclosed in the above publications may degrade the usability of a keyboard.

(3) EMI countermeasure

The case of a PC is generally so designed and manufactured that it satisfies the regulations of individual countries concerning Electromagnetic Interference (EMI) (the EMI regulations of the individual nations are, for example, VCCI for Japan, FCC for the United States, and CISPR for Europe). The most essential and effective case structure available for EMI countermeasures is one in which components that may generate or receive electromagnetic wave noise are coated with a conductive member. However, the tilt of the keyboard described in the above publications is accomplished by moving the rear portion of the keyboard unit up and down relative to the PC main body. Accordingly, when the keyboard is tilted, the sealing of the casing is deteriorated. In the above publications, however, EMI countermeasure for PCs are not significantly discussed. There is no description of how the sealing of the case is to be maintained when the keyboard unit is pushed up away from the PC main body, or how the radiation problems that arise from the emission of electromagnetic waves should be resolved.

(4) Keyboard opening

The keyboard tilting mechanism disclosed in each of the publications is not provided based on a PC for which the keyboard open operation is enabled. Therefore, there is nothing discussed concerning how to implement the keyboard tilting mechanism in notebook PCs, such as the "ThinkPad 750/755" and the "ThinkPad Power Series 820/850" that have keyboard opening mechanisms. If a tilted keyboard is opened additionally relative to the PC body, the rear edge of the tilted keyboard geometrically interferes with the lid. At the worst, the keyboard will hit and damage a LCD panel positioned at the inner face of the lid. Problems with the keyboard tilting mechanism that may occur due to the keyboard opening mechanism are not mentioned at all in the above described publications.

In Japanese Unexamined Patent Publication No. Hei 05-119885 is disclosed a tilting mechanism that tilts an entire PC main body by providing a pair of leg members at almost the rear of the bottom surface of the PC body case. With the tilting mechanism in this publication, the tilt of the keyboard is not interlocked with the opening and closing of a lid, and whether or not the keyboard is to be tilted is left to a user's discretion. In addition, since the tilting mechanism is an independent mechanism that can be mounted separately from the keyboard opening mechanism, the designing and manufacturing of the mechanism is easy. However, since the leg members must be opened or closed in addition to opening and closing the lid, some users may feel on the contrary that the procedure is inconvenient. In addition, since the leg members contact a surface on which a PC is mounted along a line (or at a point), its installation is a little unstable mechanically. When a notebook PC is balanced on the lap, which is the inherent use condition for a portable PC, the instability is especially increased. Or, since the leg members may press down into the legs of a user, such an attitude is not appropriate for long-term employment. Further, for a notebook PC, such as a ThinkPad 755CD or one of ThinkPad Power Series 820/850, where a recording medium (e.g., a CD-ROM) exchange tray is located in the front portion of the main body, it may not be possible to eject the exchange tray while the PC main body is tilted forward. It is because the tray will hit the supporting face when it is being ejected.

SUMMARY OF THE INVENTION

It is one purpose of the present invention to provide an excellent portable information processing apparatus with a lid, wherein a computer main body having a keyboard on its top surface is so coupled with a lid having a liquid crystal display panel in its inner face that the lid can be freely opened and closed.

It is another purpose of the present invention to provide an excellent portable information processing apparatus that includes a keyboard tilting mechanism for tilting a keyboard at a predetermined angle to enhance usability.

It is an additional purpose of the present invention to provide an excellent portable information processing apparatus with a keyboard tilting mechanism that does not require extra space in the interior of a PC main body, i.e., which does not degrade such structural features as compactness and thinness.

It is a further purpose of the present invention to provide an excellent portable information processing apparatus with a keyboard tilting mechanism that can disengage, as needed, the interlocking function that accompanies the opening and closing of a lid.

It is still another purpose of the present invention to provide an excellent portable information processing apparatus with a keyboard tilting mechanism that can eliminate problems related to electromagnetic interference at a PC main body when a keyboard is tilted.

It is a still further purpose of the present invention to provide a portable information processing apparatus, which has a keyboard unit that can be freely opened and closed located on the top surface of a main body, that has a keyboard tilting mechanism which, when a tilted keyboard is to be opened additionally, prevents a keyboard from geometrically interfering with a lid.

To achieve the above purposes, according to a first aspect of the present invention, a portable information processing apparatus of the type which includes a main body, a keyboard unit that mounted on the top surface of the main body, and a lid pivotally attached to the rear end of the main body, wherein the improvement comprises: (a) a keyboard base of the keyboard unit for covering the top surface of the main body; (b) a keyboard portion of the keyboard unit which is attached to the front end of, and which is rotatable in a first direction; and (c) a lever of the keyboard unit, which is attached to the rear end of the keyboard base, and which is rotatable in a second direction opposite to the first direction, for holding the keyboard portion at a still position whereat the keyboard portion is tilted at a predetermined angle.

It should be noted that, according to the first aspect of the present invention, the keyboard unit includes a keyboard tilting mechanism. More specifically, since the keyboard portion is rotatably attached at the front edge, its rear portion can be elevated and lowered relative to the keyboard base. When the tilt of the keyboard portion reaches a predetermined angle, the lever prevents the rear end of the keyboard portion from continuing upward, and halts and holds the keyboard portion at the predetermined angle that it can not be moved down in order to enable a key input operation. Since the keyboard tilting mechanism is provided on the keyboard unit, it does not require extra space within the apparatus. In other words, the feature of a portable information processing apparatus, i.e., a compact and thin structure, is not degraded. In addition, the lever rotates in a direction (the second direction) that is the opposite of the direction (the first direction) in which the keyboard portion is rotated, and stands upright.

The design may provide for the lever to be pushed down by the lid as the lid is being closed when the keyboard portion is at the still position. With this structure, even if a user closes the lid carelessly, the rear end of the keyboard portion will not strike and damage the lid (the LCD panel).

BRIEF DESCRIPTION OF THE DRAWINGS

Some of the purposes of the invention having been stated, others will appear as the description proceeds, when taken in connection with the accompanying drawings, in which:

FIGS. 7(a) and 7(b) are diagrams showing the keyboard unit 20 when the keyboard portion 21 is closed flat, with FIG. 7(a) specifically being a right side view of the keyboard unit 20 when the keyboard portion 21 is closed, and with FIG. 7(b) specifically being an enlarged perspective view of the periphery of a hole 28a.

FIGS. 8(a) and 8(b) are diagrams showing the keyboard unit 20 when the keyboard portion 21 is tilted at a predetermined angle, with FIG. 8(a) specifically being a right side view of the keyboard unit 20 when the keyboard portion 21 is tilted, and with FIG. 8(b) specifically being an enlarged perspective view of the periphery of the hole 28a.

FIG. 13 is a front perspective view of the lid 50 when it is opened at almost 90 degrees.

FIG. 15 is a diagram illustrating a lever 27a and a stopper 35a for halting the movement of the lever 27a.

FIG. 17 is a cross sectional view of the keyboard unit 20 near the hole 28a.

DESCRIPTION OF THE PREFERRED EMBODIMENT(S)

Figure 1:
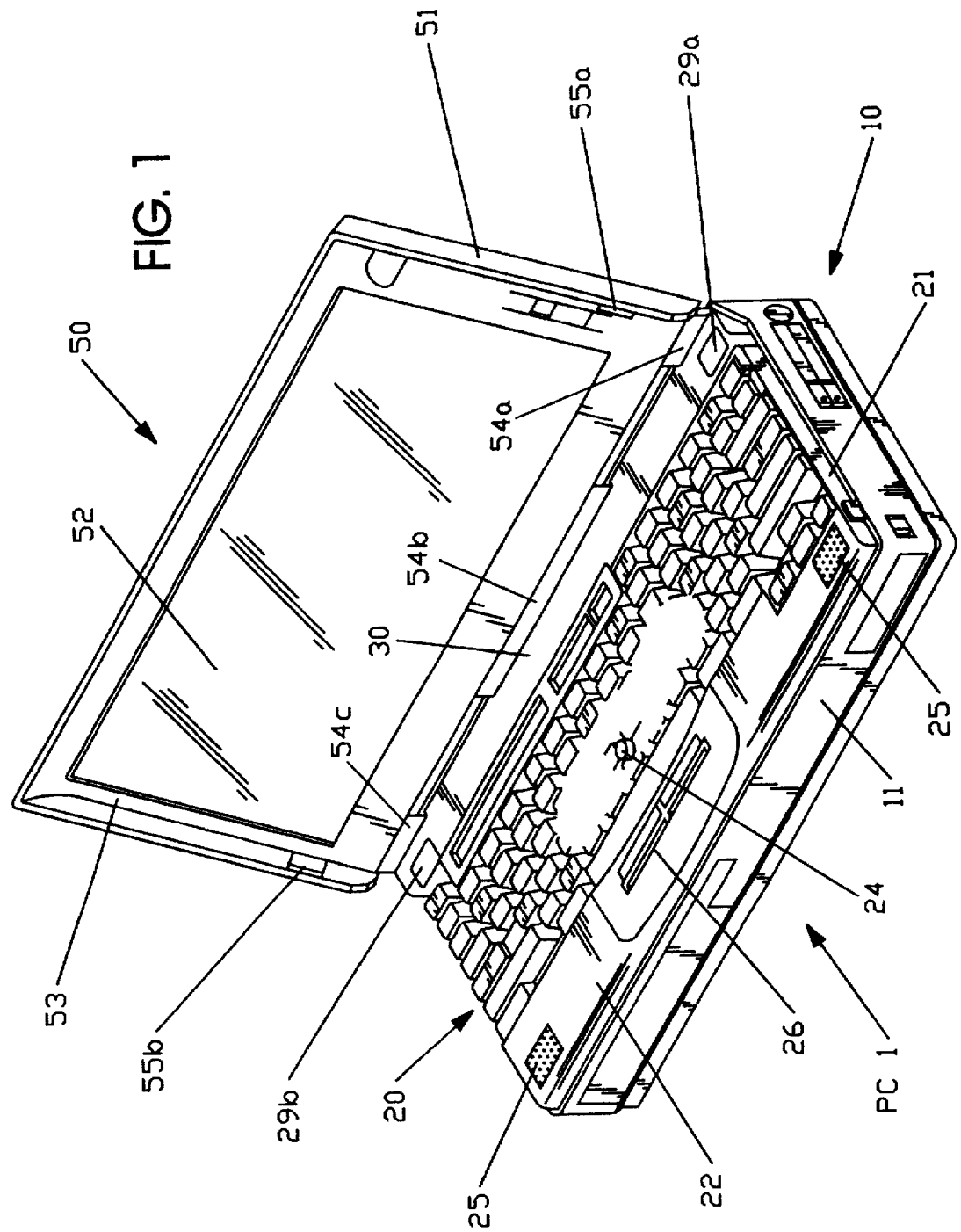
FIG. 1 is a perspective diagram illustrating a notebook PC 1 according to one embodiment of the present invention.

While the present invention will be described more fully hereinafter with reference to the accompanying drawings, in which preferred embodiments of the present invention are shown, it is to be understood at the outset of the description which follows that persons of skill in the appropriate arts may modify the inventions here described while still achieving the favorable results of these inventions. Accordingly, the description which follows is to be understood as being a broad, teaching disclosure directed to persons of skill in the appropriate arts, and not as limiting upon the present inventions.

To achieve the purposes stated above, according to a first aspect of the present invention, a portable information processing apparatus of the type which includes a main body, a keyboard unit that mounted on the top surface of the main body, and a lid pivotally attached to the rear end of the main body, wherein the improvement comprises: (a) a keyboard base of the keyboard unit for covering the top surface of the main body; (b) a keyboard portion of the keyboard unit which is attached to the front end of, and which is rotatable in a first direction; and (c) a lever of the keyboard unit, which is attached to the rear end of the keyboard base, and which is rotatable in a second direction opposite to the first direction, for holding the keyboard portion at a still position whereat the keyboard portion is tilted at a predetermined angle.

It should be noted that, according to the first aspect of the present invention, the keyboard unit includes a keyboard tilting mechanism. More specifically, since the keyboard portion is rotatably attached at the front edge, its rear portion can be elevated and lowered relative to the keyboard base. When the tilt of the keyboard portion reaches a predetermined angle, the lever prevents the rear end of the keyboard portion from continuing upward, and halts and holds the keyboard portion at the predetermined angle that it can not be moved down in order to enable a key input operation. Since the keyboard tilting mechanism is provided on the keyboard unit, it does not require extra space within the apparatus. In other words, the feature of a portable information processing apparatus, i.e., a compact and thin structure, is not degraded. In addition, the lever rotates in a direction (the second direction) that is the opposite of the direction (the first direction) in which the keyboard portion is rotated, and stands upright.

The design may provide for the lever to be pushed down by the lid as the lid is being closed when the keyboard portion is at the still position. With this structure, even if a user closes the lid carelessly, the rear end of the keyboard portion will not strike and damage the lid (the LCD panel).

The structural details of the keyboard unit and the lever are as follows. In the keyboard portion is provided a hole through which the lever is inserted. The lever has an L shape, and one end of the longer leg of the L-shaped lever is so attached to the keyboard base that the lever is rotatable. While the lever is being rotated, the longer leg side slides within the hole that is formed in the keyboard portion. As the lever is rotated in the second direction until it is erected, the keyboard portion is turned in the first direction and is elevated. The ascent and descent of the keyboard portion is interlocked with the lifting up and the pushing down of the lever. The shorter leg of the L-shaped lever then abuts against the keyboard portion at the still position to prevent the keyboard portion from being rotated greater than the predetermined angle.

A head portion larger than the hole may be provided at the other end of the shorter leg of the L-shaped lever. In addition, a protrusion may be formed at the side of the head portion, and a groove along which the protrusion slides may be formed in a corresponding position on the lid. While the lid is being opened and closed, the protrusion is guided along the groove and the lever is raised and lowered in accordance with that movement. In other words, the automatic tilt of the keyboard portion until the predetermined angle is interlocked with the opening and the closing of the lid.

The groove formed in the lid may be so long that, during a period beginning at the point where the lid is closed and continuing until immediately before the lid is fully open, the protrusion is engaged with the groove. When the lid is opened fully, the protrusion is released from the groove. With this structure, the keyboard portion is automatically tilted until the predetermined angle as the lid is opened, and once the keyboard portion reaches the still position, the interlocking of the lid with the lever is released. Therefore, if the tilted keyboard portion adversely affects usability, a user can retract down the keyboard portion so that it is flat.

The head of the lever may be so formed that at the still position it projects outward from the rear end of the keyboard portion, and abuts against the lid before the keyboard portion does and is rotated down when the lid is closed. With this arrangement, even when a user closes a lid carelessly, the keyboard portion will not strike and damage the LCD panel in the lid.

Further, a foot plate that is almost as wide as a gap between the keyboard portion and the keyboard unit at the still position may be integrally assembled with the lever. Since the foot plate supports the keyboard portion at the still position from the bottom side, mechanical stability can be maintained to counter an impact due to key depression, etc.

According to a second aspect of the present invention, a portable information processing apparatus of the type which includes a main body, a keyboard unit mounted on the top surface of the main body, and a lid pivotally attached to the rear end of the main body, wherein the improvement comprises: (a) a keyboard base of the keyboard unit, which is pivotally attached to the rear end of main body, for covering the top surface of the main body; (b) a keyboard portion of the keyboard unit which is attached to the front end of the keyboard base, and which is rotatable in a first direction; and (c) a lever of the keyboard unit, which is attached to the rear end of the keyboard base, and which is rotatable in a second direction opposite to the first direction, for holding the keyboard portion at a still position whereat the keyboard is tilted at a predetermined angle. A keyboard opening mechanism of the keyboard base (a) enables the exchange of a battery pack and peripheral devices installed into the main body. According to the second aspect of the present invention, since the keyboard tilting mechanism is provided on the keyboard unit, the mechanism for opening and closing the keyboard unit can be relatively easily designed and manufactured.

According to the second embodiment, when the keyboard unit is being opened, the rear edge of the raised keyboard portion may interfere with the lid (the LCD panel), as previously described. A modification of the second aspect is provided wherein the head portion of the lever is so formed that at the still position it projects outward from the rear end of the keyboard portion. According to the modification, when the keyboard base is opened relative to the main body, the head portion of the lever abuts against the lid earlier than the rear end of the keyboard portion does and is rotated down. Therefore, even when a user accidentally opens the keyboard base while the keyboard portion is tilted, the rear end of the keyboard portion will not strike and damage the LCD panel.

In the second aspect, the lever may be pushed down by the lid as the lid is being closed when the keyboard portion is tilted at the still position. Further, the structural details of the keyboard unit and the lever are the same as those in the first aspect, with the exception that the keyboard base is so attached that it can be opened and closed against the main body. As a result, advantages, such as that the tilt of the keyboard portion is interlocked with the opening and closing of the lid and that once the lid is opened it can be folded by a user, that can be obtained in the first aspect can also be acquired on the second aspect.

Figure 19A:
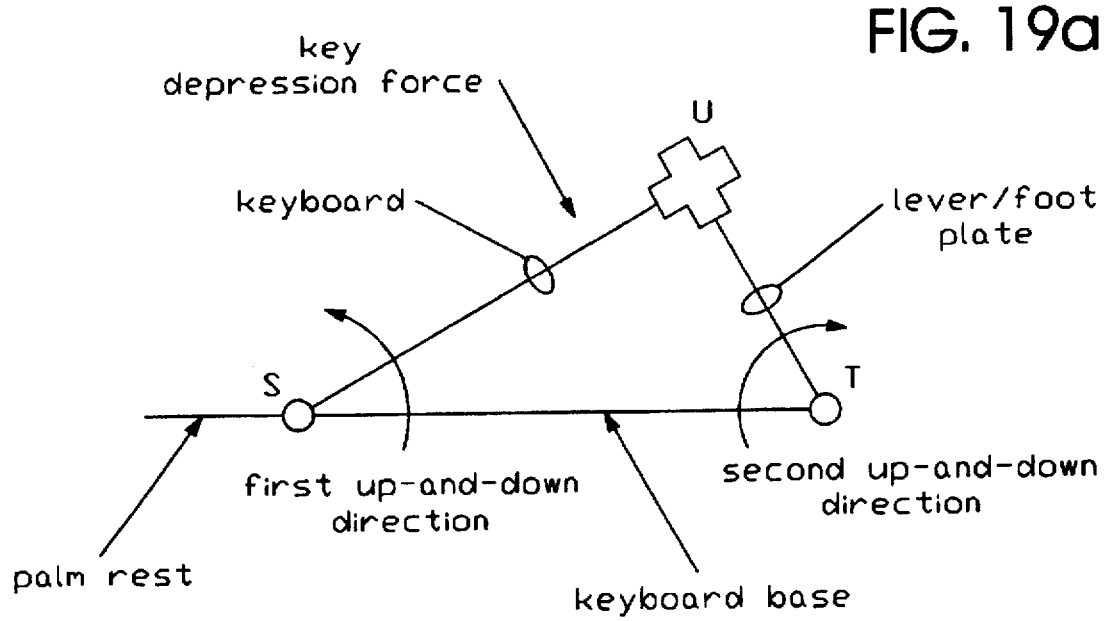
FIGs. 19(a) and 19(b) are conceptual diagrams showing the keyboard unit according to the present invention.
Figure 19B:
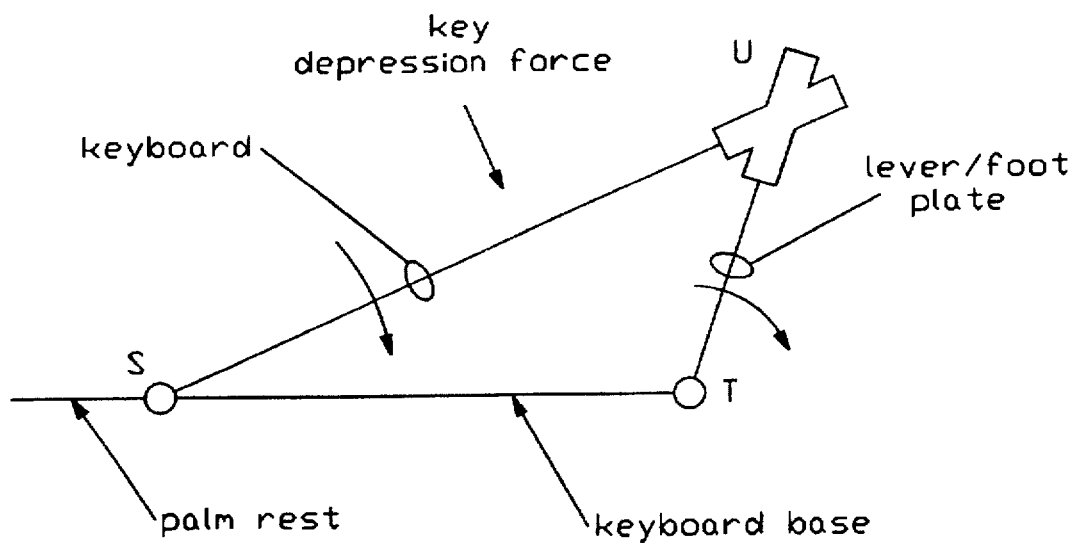

FIG. 19(a) is a conceptual diagram illustrating a keyboard unit according to the present invention. A keyboard portion and a lever (foot plate) are coupled with a keyboard unit at points S and T, respectively. The keyboard portion and the lever (foot plate) are coupled together at a joint U by a slider mechanism that slides longitudinally. As a result, the keyboard portion is raised and lowered in the first direction, and the lever (foot plate) is lifted up and pushed down in the second direction, which is the opposite direction to the first up-to-down direction. It should be noted that when the keyboard portion is held by the shorter leg of the lever the slider mechanism at joint U is held, and then the rotational positions of the keyboard portion and the lever are fixed. The keyboard portion and the lever (foot plate) are crossed in opposite directions. With the structure shown in FIG. 19(a), an impact force V due to key depression can be dispersed. It would be easily understood that the structure shown in FIG. 19(a) is mechanically more stable than a structure wherein the keyboard portion and the lever (foot plate) may be rotated in the same direction, as is shown in FIG. 19(b).

A common portable information processing apparatus includes a display device, such as a liquid crystal display panel. According to each aspect of the present invention, a liquid crystal display panel may be located at almost the center of the inner face of the lid.

The keyboard base may cover the entire top surface of the apparatus, and may be formed of a material, such as a metal plate or an FRP, that absorbs electromagnetic waves. Even when the keyboard portion is tilted, the sealing of the apparatus can be maintained by the keyboard base under the keyboard portion, so that the EMI problem can be resolved. In addition, a relatively strong material can be employed for a keyboard base to reinforce the mechanical strength of the apparatus when its top face is exposed.

The mechanical structure of a notebook PC employed for this embodiment of the present invention will now be explained, mainly by referring to the mechanism of a keyboard unit 20.

FIG. 1 is a perspective view of a notebook PC (hereinafter referred to simply as a "PC") 1 according to one embodiment of the present invention. The PC 1 comprises a thin main body 10 and a lid 50 that is so attached to the main body 10 that it can be opened and closed. In FIG. 1, the lid 50 is in the open state.

The main body 10 includes a shallow case 11, a keyboard unit 20 that covers the top of the case 11 and a support plate 30 at the rear of the top face of the case 11. The keyboard unit 20 has a keyboard portion 21 wherein keys are arranged conforming to a predetermined specification, a palm rest 22 that is provided in front of the keyboard portion 21, and a keyboard base 23 (not shown in FIG. 1) on which the keyboard portion 21 and the palm rest 22 are mounted. A pointing device 24 (e.g., a "TrackPoint" ("TrackPoint" is a trademark of IBM Corp.)) for pointing at input coordinates is inserted almost in the center of the keyboard portion 21. The palm rest 22 includes internally mounted flat loudspeakers 25 at both sides, and also has a pair of drag buttons 26 almost in its center. A pair of tongue pieces 29a and 29b project from the rear edge of the keyboard unit 20 (more specifically, from the keyboard base 23). Since the tongue pieces 29a and 29b are so attached to the support plate 30 that they are rotatable at an axis C (see FIG. 3), a "keyboard opening/closing operation" for opening and closing the keyboard unit 20 relative to the main body 10 can be performed. The keyboard unit 20 also includes a "keyboard tilting mechanism" for raising the rear of the keyboard portion 21 so as to tilt the keyboard unit 20 at a predetermined angle. The keyboard opening mechanism and the keyboard tilting mechanism of the keyboard unit 20 will be described in detail later.

The lid 50 includes a shallow case 51, a liquid crystal display (LCD) panel 52 that serves as a display device, and a bezel 53 that supports the LCD panel 52. One end of each of three hinged portions 54a, 54b and 54c, which can be rotated by applying a predetermined torque, is formed at almost the rear edge of the case 51, while the other end of each of these hinged portions 54a, 54b and 54c is fixed to the main body 10. With this structure, the lid 50 is so attached to the main body 10 that it can be opened and closed.

Figure 2:
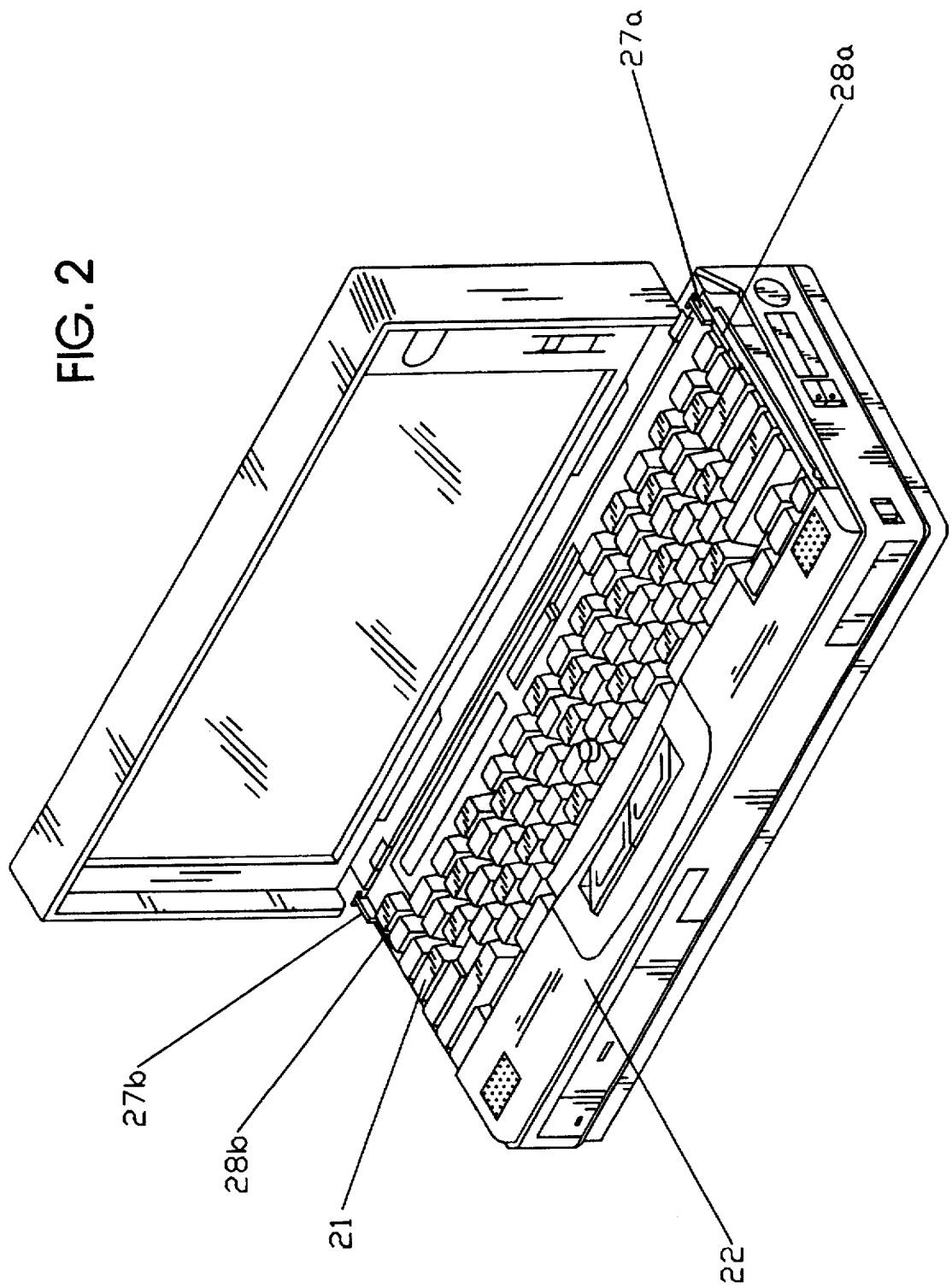
FIG. 2 is a perspective diagram illustrating the notebook PC 1 when a keyboard tilting mechanism is driven.

FIG. 2 is a perspective view of the notebook PC 1 when the keyboard tilting mechanism of the keyboard unit 20 is operated.

The keyboard portion 21 is pivoted at the keyboard base 23 (not shown in FIG. 2) around axis A (see FIG. 3) at the front edge. A pair of levers 27a and 27b are rotatably attached to the right and left rear corners of the keyboard base 23. A pair of about rectangular holes 28a and 28b are formed in the right and left rear corners of the keyboard portion 21, so that the distal ends of the respective levers 27a and 27b can be inserted through them. As the keyboard portion 21 is rotated counterclockwise (CCW) around the axis A, it is tilted forward, i.e., toward a user. As the rear portion of the keyboard portion 21 ascends, the levers 27a and 27b are raised clockwise (CW) through the holes 28a and 28b, respectively. The distal ends of the levers 27a and 27b are so formed that they hold the keyboard portion 21 at a predetermined tilted angle, which will be described in detail later.

Figure 20:
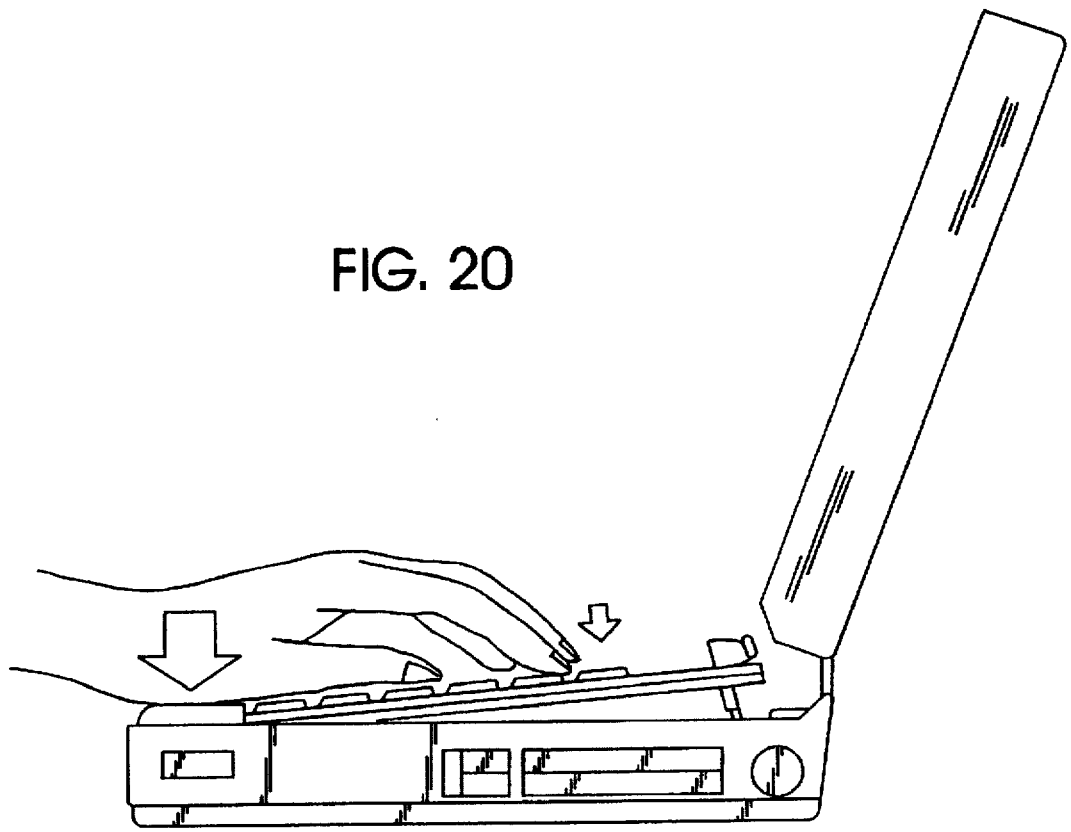
FIG. 20 is a right side view of the notebook PC 1 in use.

The palm rest 22 is an unmovable portion that is fixed to the keyboard base 23 and does not interlock with the rotation of the keyboard portion 21. FIG. 20 is a right side elevational view of the notebook PC 1 in use. As is shown in FIG. 20, the force applied to the tilted keyboard portion 21 is only an impact force due to key depression, and the weight of the hands is placed only on the palm rest 22. The length of the tilted portion to the front is reduced by the longitudinal width of the palm rest 22, so that the distortion and deformation due to applied weight becomes small. This can provide the stability for key depression.

Figure 3:
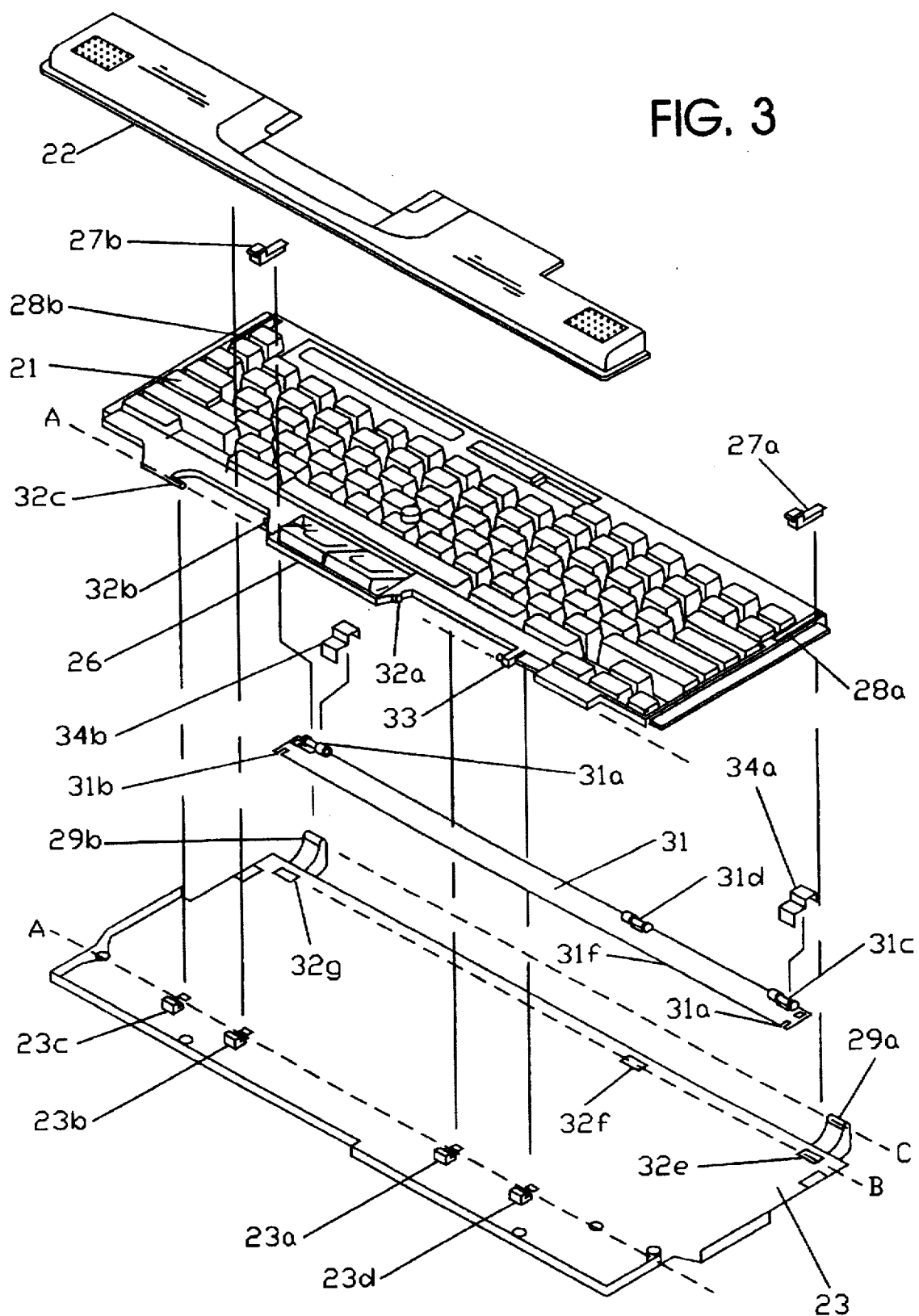
FIG. 3 is an exploded diagram of a keyboard unit 20.

FIG. 3 is an exploded diagram of the keyboard unit 20. As is described above, the keyboard unit 20 includes, as main components, the keyboard portion 21, the palm rest 22, the keyboard base 23, the levers 27a and 27b, and a foot plate 31.

Various keys, such as alphabet keys, function keys and cursor keys, are arranged on the top surface of the keyboard portion 21 conforming to a predetermined specification. The pair of drag buttons 26 are also almost centrally located at the front edge of the keyboard portion 21. In addition, three protrusions 32a, 32b and 32c, which project in a direction A that is indicated by a broken line, and a single shaft 33 are so formed in the front edge of the keyboard portion 21 that the keyboard portion 21 can be pivoted at the keyboard base 23. The holes 28a and 28b are formed in the right and left rear corners of the keyboard portion 21 and the levers 27a and 27b are inserted through them.

The levers 27a and 27b are almost L-shaped. The longer legs in the L-shaped levers 27a and 27b are inserted through the respective holes 28a and 28b, and engaged at junctions 31a and 31b at both ends of the foot plate 31. The foot plate 31 and the levers 27a and 27b are, therefore, integrally formed and act on the tilt of the keyboard portion 21, which will be described later. In addition, three shafts 31c, 31d, 31e are formed at the rear edge of the foot plate 31 in direction B, which is indicated by a broken line, so that the foot plate 31 is pivoted around these shafts at the keyboard base 23.

Figure 4:
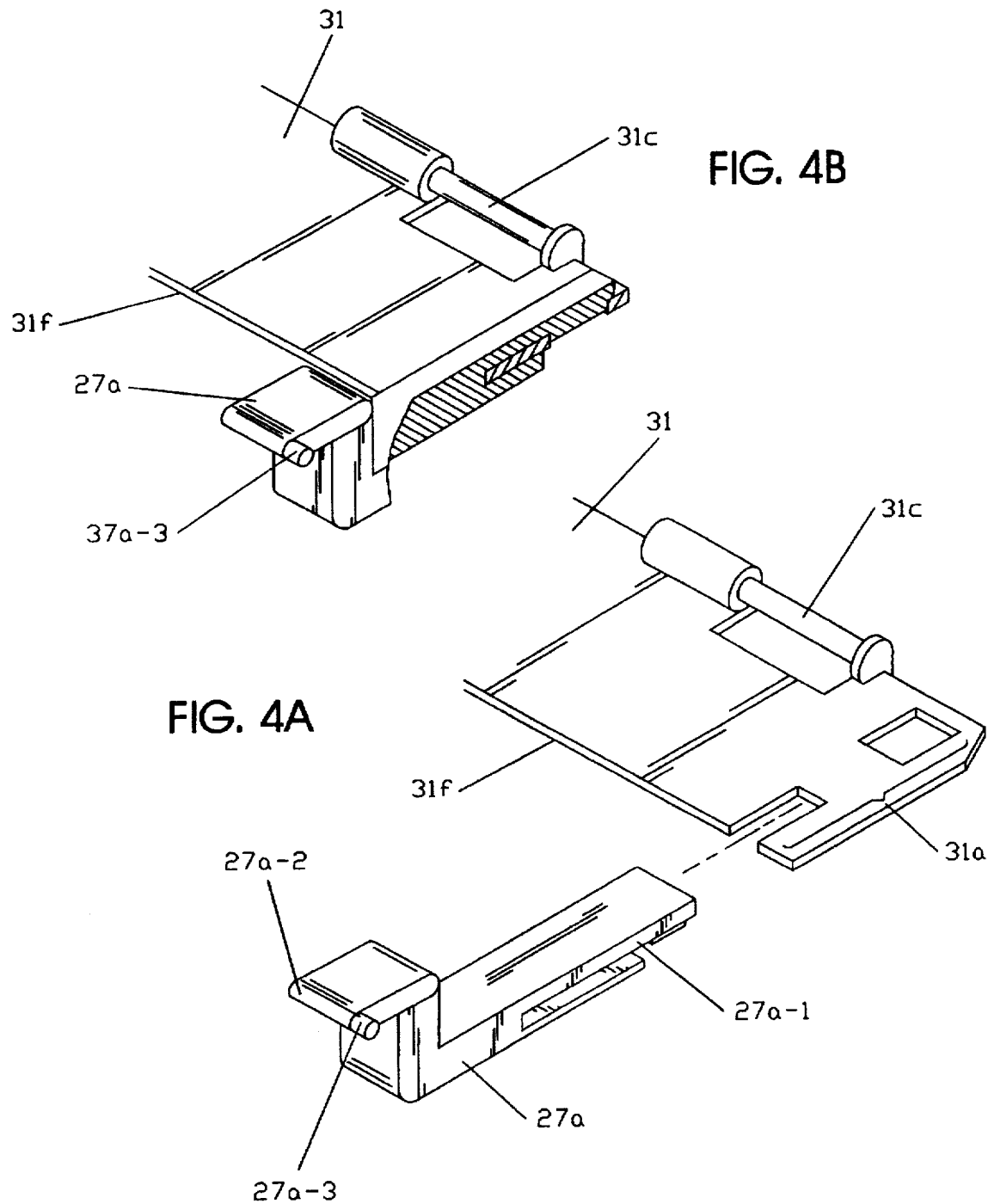
FIGS. 4(a) and 4(b) are enlarged diagrams showing a lever 27a and the right half portion of a foot plate 31, with FIG. 4(a) showing an exploded diagram and FIG. 4(b) showing the assembly.

FIG. 4(a) and FIG. 4(b) are enlarged diagrams showing the lever 27a and the right half portion of the foot plate 31. FIG. 4(a) is an exploded diagram, and FIG. 4(b) is a cross sectional view of the assembly of the lever 27a and the foot plate 31. The distal portion of the longer leg of the lever 27a is so formed in an angular C shape 27a-1 that it can be adequately secured at the junction 31a of the foot plate 31. Further, a protrusion is so formed on the upper interior front end of the angular C shaped portion 27a-1 that it engages the opening that is formed at the junction 31a. A head portion 27a-2 that is wider than the hole 28a is formed in the end of the shorter leg of the lever 27b, and a protrusion 27a-3 extends toward the right side. The foot plate 31 that is integrally assembled with the lever 27a is pivoted at the keyboard base 23 around the shafts 31c, 31d and 31e at its rear edge. The shapes of the lever 27b and the junction 31b are symmetrically the same as those of the lever 27a and the junction 31a, respectively.

The keyboard base 23 will be explained while referring back to FIG. 3. The keyboard base 23 is so formed that it covers the top surface of the main body case 11. The pair of tongue pieces 29a and 29b are formed at the rear end of the keyboard base 23. The tongue pieces 29a and 29b have a protrusion that projects in direction C, which is indicated by a broken line. Since the keyboard base 23 is rotatably supported at the support plate 30 by the protrusions, even though such a state is not shown in FIG. 3, the keyboard base 23 can be opened and closed relative to the main body case 11 around the axis C (i.e., opening the keyboard is permitted). The bottom surface of the keyboard base 23 is so designed that a metal plate or an FRP (Fiber Reinforced Plastic) which includes metal fiber, (neither of them shown) is put on it. On the bottom surface of the keyboard base 23, four recessed portions 23a, 23b, 23c and 23d are formed in a line (along the axis A) in order for the keyboard portion 21 to pivot at three protrusions 32a, 32c and 32c and around the shaft 33. Further, three recessed portions 32e, 32f and 32g are also formed in a line (along the axis B) on the top surface of the keyboard base so that the foot plate 31 can be pivoted around the shafts 31c, 31d and 31e.

The keyboard unit 20 that is constituted by the above components is assembled in accordance with the following procedures, for example.

(1) The three protrusions 32a, 32b and 32c, and the shaft 33 are fitted in the respective recessed portions 23a, 23b, 23c and 23d, so that the keyboard portion 21 is mounted rotatably on the keyboard base 23.

(2) The palm rest 22 is fitted in front of the keyboard base 23. The palm rest 22 also serves as a protective cover for the pivoted portion at the front edge of the keyboard portion 21.

(3) The longer legs in the L-shaped levers 27a and 27b are respectively inserted through the holes 28a and 28b from above the keyboard portion 21. Then, the angular C shaped portions 27a-1 and 27b-1 of the longer legs are respectively engaged with the junctions 31a and 31b of the foot plate 31.

(4) The shafts 31c, 31d and 31e are fitted into the recessed portions 32e, 32f and 32g to rotatably attach the foot plate 31 to the keyboard base 23. Then, fixing pieces 34a and 34b are fitted over the shafts 31c and 31e to protect their upper portions.

Figure 5:
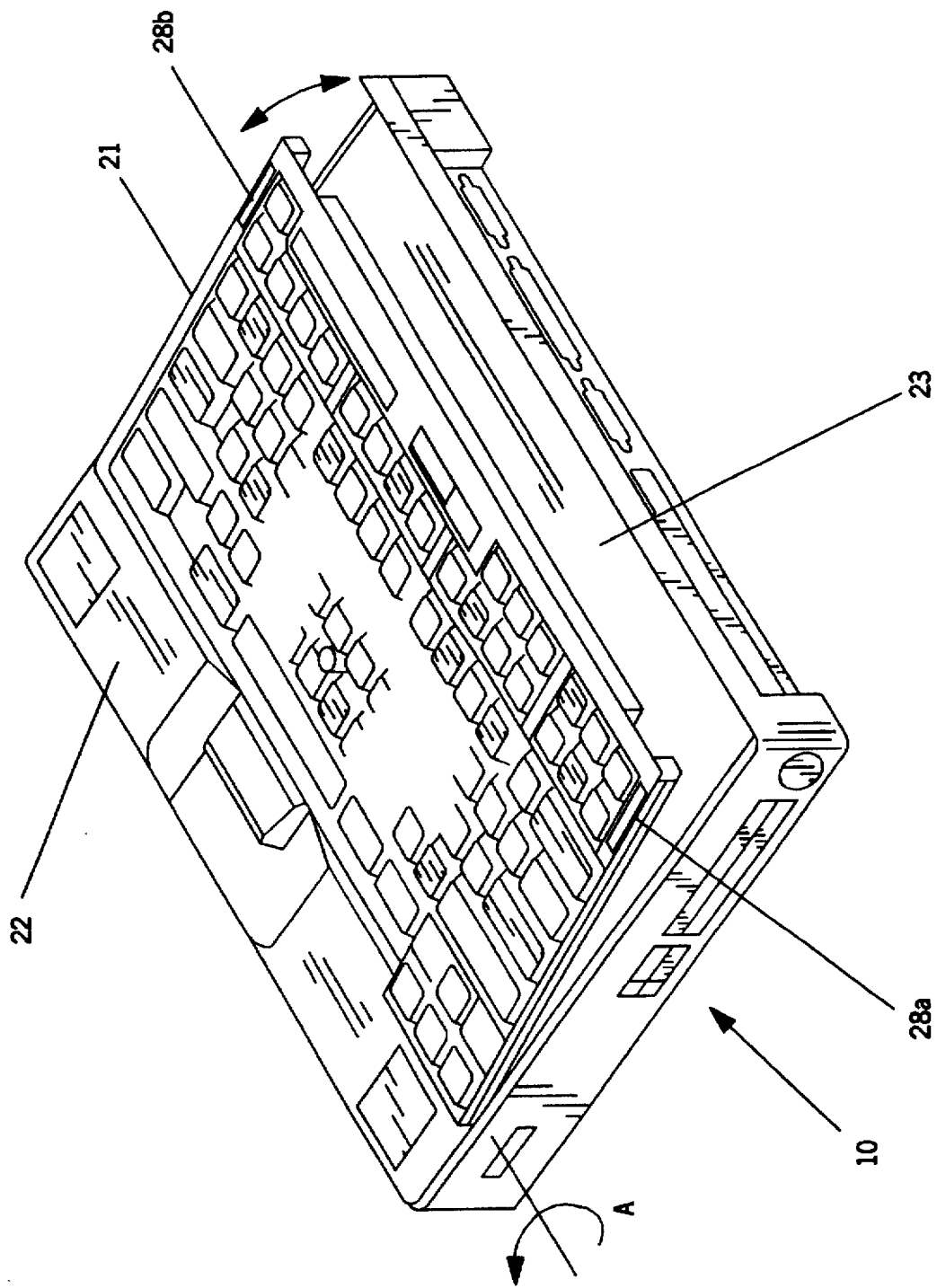
FIG. 5 is a diagram showing the degree of freedom of rotation for a keyboard portion 21 that is attached to a keyboard base 23.
Figure 6A:
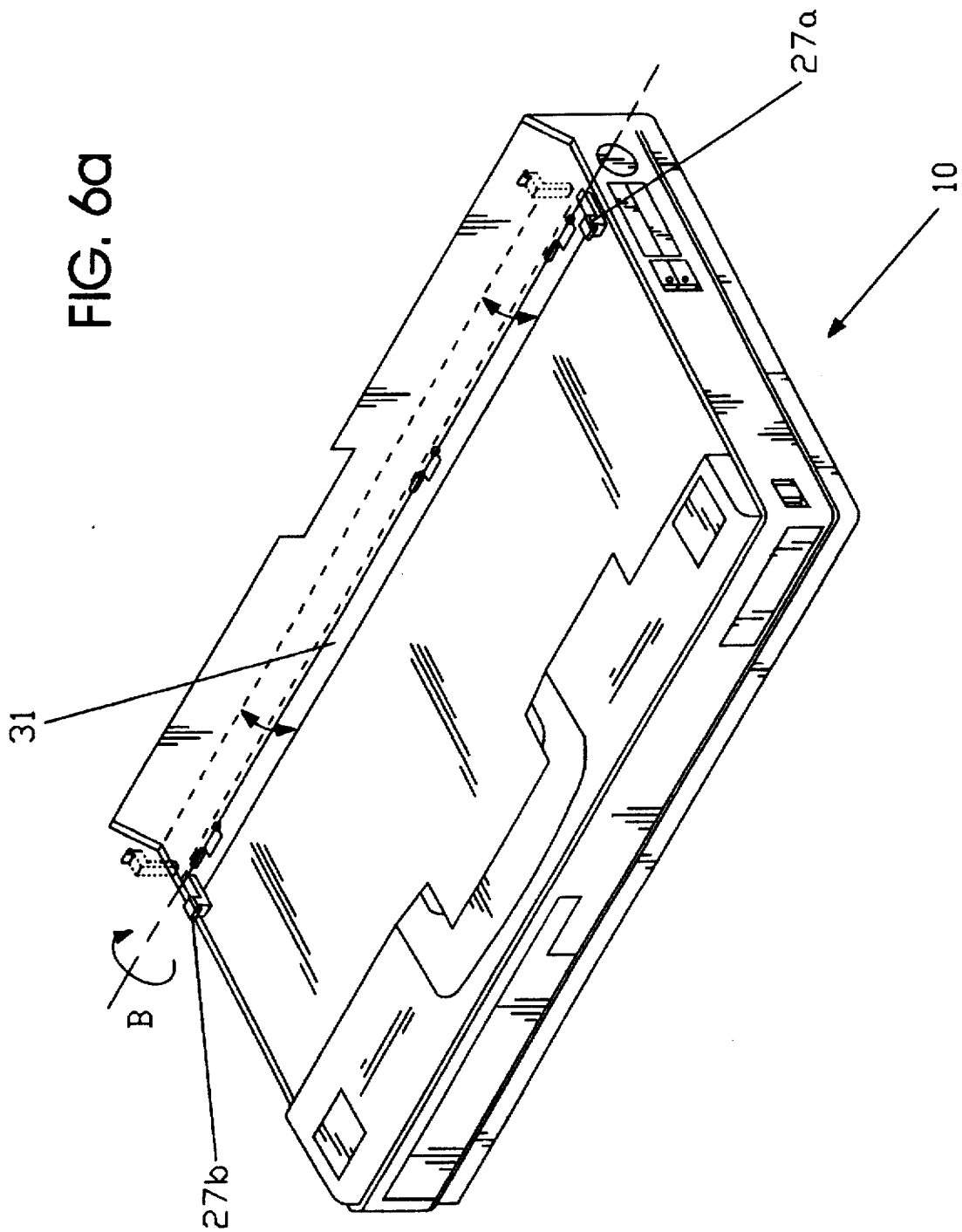
FIGS. 6(a) and 6(b) are diagrams showing the degree of freedom of rotation for the foot plate 31 that is attached to the keyboard base 23.
Figure 6B:
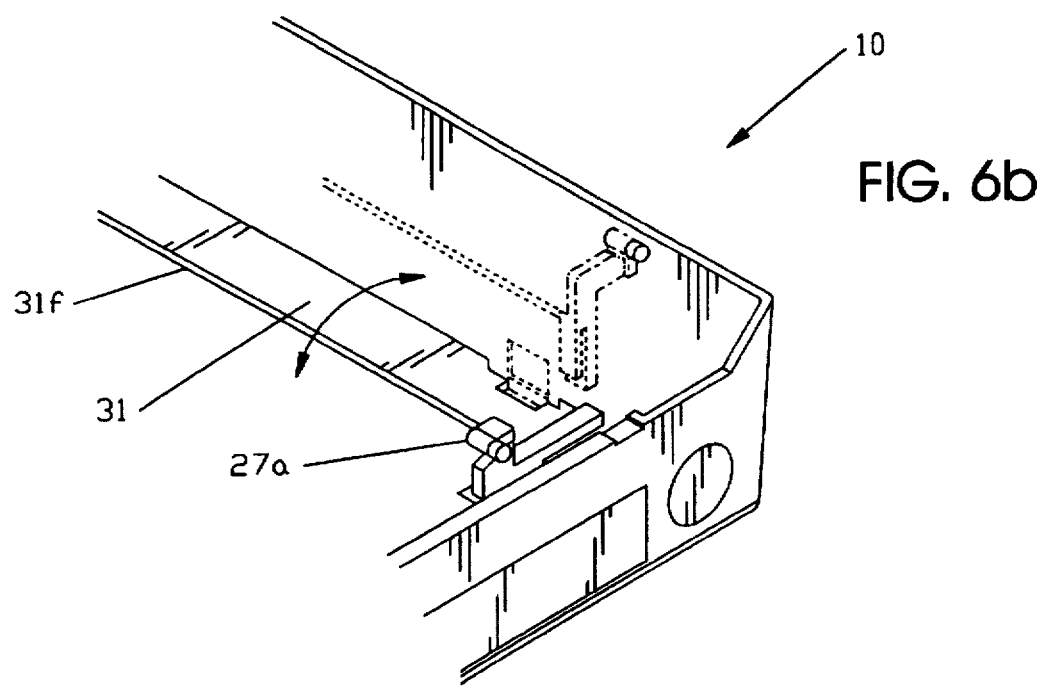

Of the components of the keyboard unit 20, those that are movable are the keyboard portion 21 and the foot plate 31 which is integrally formed with the levers 27a and 27b. In FIGS. 5 and 6 are shown the degrees of freedom of rotation for the keyboard portion 21 and the foot plate 31 that are attached to the keyboard base 23. The keyboard portion 21 is pivoted relative to the keyboard base 23 at the recessed portions 23a through 23d, and can be raised counterclockwise (CCW) around the axis A, as is shown in FIG. 5. The foot plate 31 is pivoted relative to the keyboard base 23 at the recessed portions 32e, 32f and 32g, and can be raised clockwise (CW) around the axis B, as is shown in FIG. 6.

Actually, the keyboard portion 21 and the foot plate 31 are not independently driven as shown in FIGS. 5 and 6. While being rotated, they mutually limit the rotation of each other. For example, while the keyboard portion 21 is rotated, its movement is restricted by the levers 27a and 27b that pass through the holes 28a and 28b. The rear portion of the keyboard portion 21 is raised by the upward force exerted by the foot plate 31 that abuts against the bottom surface of the keyboard portion 21. The mechanical operational relationship between the keyboard portion 21 and the levers 27a and 27b (or the foot plate 31) will be explained later in subdivision B.

Electric circuits and wiring included in the keyboard unit 20 are not necessary for an explanation of the functions of the present invention, and are not shown in FIG. 3. Small items that engage the individual components are also not shown in order to simplify the explanation.

The keyboard portion 21 and the foot plate 31 have the degree of freedom of rotation shown in FIGS. 5 and 6, respectively. Once the keyboard portion 21 and the foot plate 31 are assembled, however, they are not independently operated. That is, while the keyboard portion 21 and the foot plate 31, which include the levers 27a and 27b, mutually limit the movement of each other, they permit the keyboard portion 21 to be tilted relative to the keyboard base 23, and to be held at a predetermined tilted angle. In this subdivision, the keyboard tilting mechanism according to the present invention will be explained while referring to FIGS. 7 and 8, which show the postures of the keyboard unit 20.

Figure 7A:
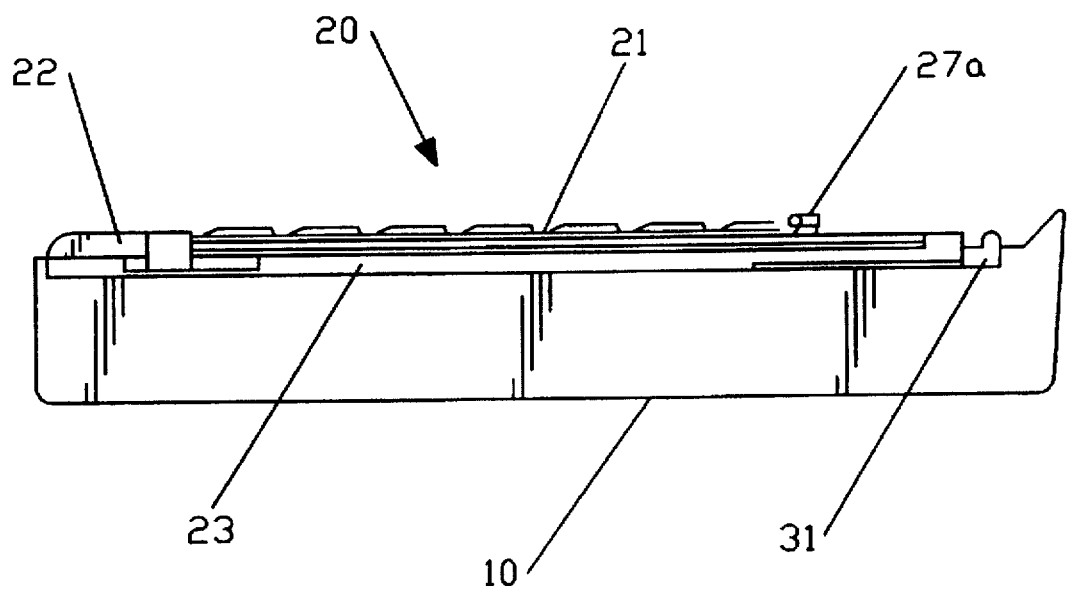
Figure 7B:
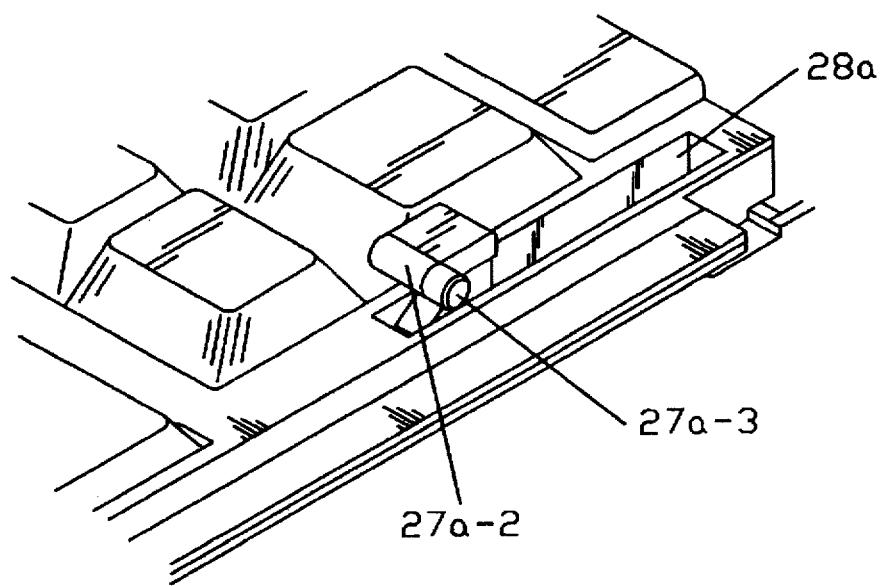

FIG. 7(a) is a right side view of the keyboard unit 20 when the keyboard portion 21 is closed flat, and FIG. 7(b) is an enlarged perspective view of the periphery of the hole 28a. As is shown in FIGS. 7(a) and 7(b), with the keyboard portion 21 flat, the keyboard portion 21, the levers 27a and 27b, and the foot plate 31 are folded down on the keyboard base 23. Since the head portion 27a-2 of the lever 27a is wider than the almost rectangular hole 28a, the lever 27a is not positioned below the top surface of the keyboard portion 21 even when it is completely folded.

When the force that is exerted almost to the rear (i.e., the clockwise force) is applied to the levers 27a and 27b, the longer legs in the L-shaped levers 27a and 27b slide in the hole 28a, and the levers 27a and 27b and the integrally assembled foot plate 31 are pivoted clockwise at the axis B and raised. As the foot plate 31 is elevated, the keyboard portion 21 receives the upward force at a front edge 31f of the foot plate 31 that abuts against the bottom of the keyboard portion 21. As a result, the keyboard portion 21 is pivoted counterclockwise around the axis A, and so raised that it is set in a position whereby the front side is low and the rear side is high.

Figure 8A:
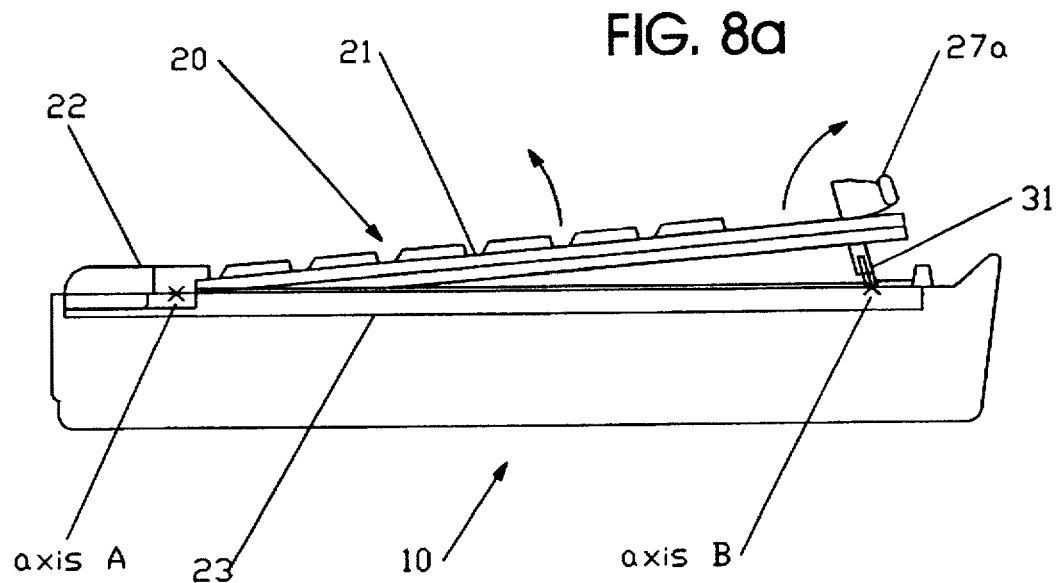
Figure 8B:
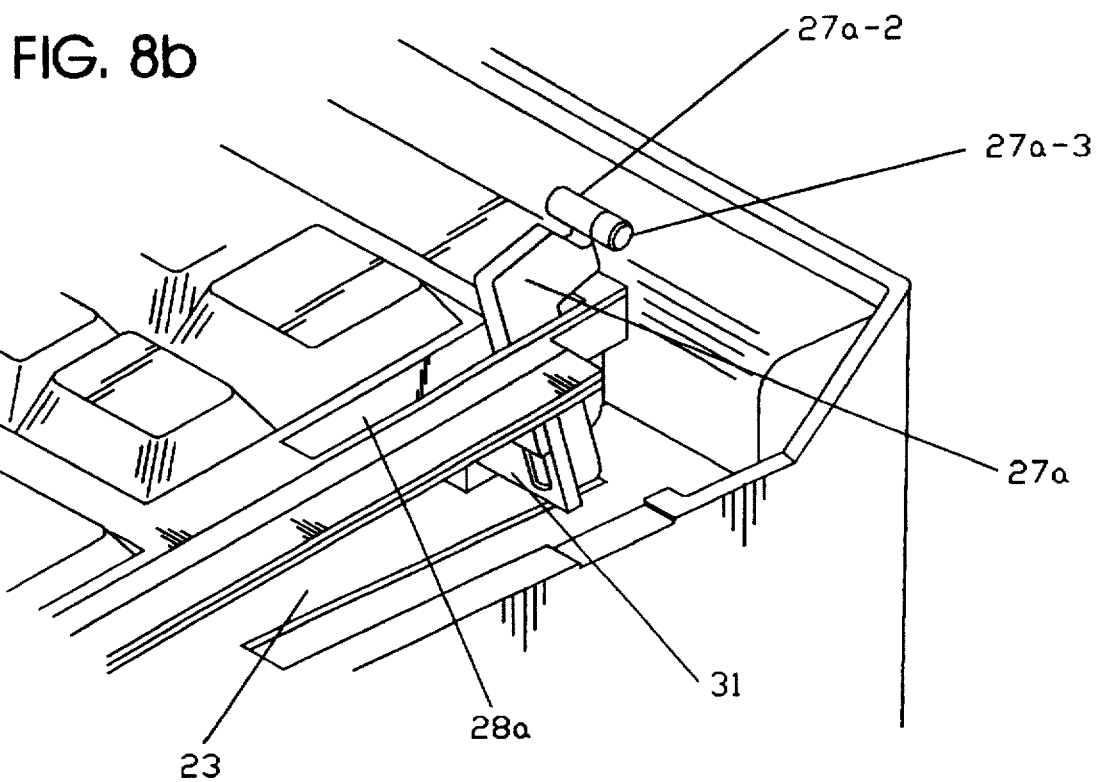

When the tilt of the keyboard portion 21 reaches a predetermined angle, its counterclockwise rotation is halted by the levers 27a and 27b. FIG. 8(a) is a right side view of the keyboard unit 20 when the keyboard portion 21 is tilted at a predetermined angle, and FIG. 8(b) is an enlarged perspective view of the periphery of the hole 28a. As is shown in FIGS. 8(a) and 8(b), the shorter leg in the L-shaped lever 27a holds the keyboard portion 21 at the rear of the hole 28a, so that the counterclockwise rotation of the keyboard portion 21 is halted and the keyboard portion 21 is held at a predetermined tilted angle. Though not shown in FIG. 8, the bottom surface of the keyboard portion 21 contacts the front edge 31f of the foot plate 31 and is so supported that it can not descend. Hereafter, the status where the keyboard portion 21 is held and supported at a predetermined tilted angle is called a "hold state", and its position is called a "still position".

In the hold state as is shown in FIG. 8, the rotational direction at the axis A (clockwise) to fold the keyboard portion 21 is the opposite of the rotational direction at the axis B (counterclockwise), as is previously described. In this manner, the weight of the keyboard portion 21 itself and the impact force due to key depression by a user can be dispersed. It should be easily understood by the one having ordinary skill in the art that this example is mechanically more stable than would be an arrangement where the rotational directions of the keyboard portion 21 and of the foot plate 31 are identical (see FIG. 19(b)).

Figure 9:
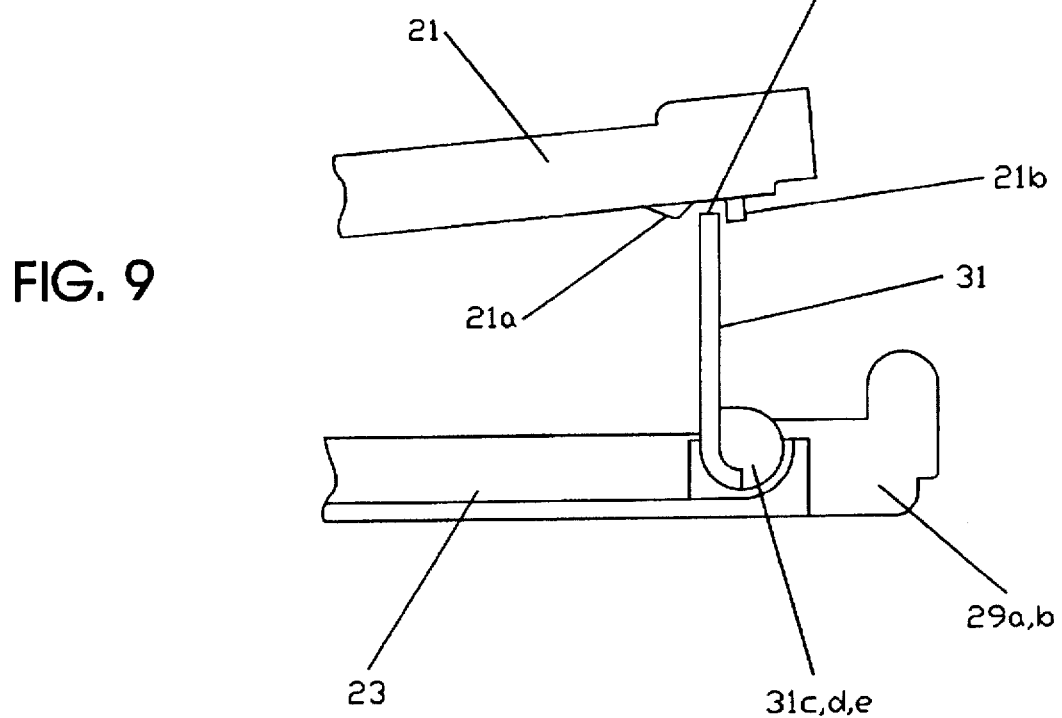
FIG. 9 is an enlarged right side view showing the vicinity of a front edge 31f of the foot plate 31 when the keyboard portion 21 is tilted at a predetermined angle.

FIG. 9 is an enlarged right side view of the vicinity of the front edge 31f of the foot plate 31 in the hold state. As the lever 27a slides along the hole 28a and is raised, the front edge 31f of the foot plate 31 slides the bottom surface of the keyboard portion 21. The front edge 31f crosses over a slightly raised portion 21a formed on route of the sliding face, then it is halted by a protrusion 21b that is provided behind. The foot plate 31 is then secured between the raised portion 21a and the protrusion 21b by relatively small latching force.

The tilt of the keyboard portion 21 is realized by elevating the rear portion of the keyboard portion 21, as is shown in FIG. 8, and the rear portion is thereby opened. In this embodiment, the keyboard portion 21 is attached to the keyboard base 23, not to the main body case 11, and the keyboard base 23 fully covers the top face of the main body case 11. As is previously described, the keyboard base 23 is made of conductive material, and the top face of the main body 10 of the PC 1 is kept sealed. Therefore, the interference due to electromagnetic waves that may leak out from the inside of the main body case 11 does not occur.

In the above subdivision, the keyboard tilting mechanism that is included in the keyboard unit 20 has been explained. This keyboard tilting mechanism is driven by interlocking with the opening of the lid 50. In this subdivision, the operation for opening the lid 50 and the interlocking with the keyboard tilt will be explained in detail while referring to FIGS. 10 through 13.

Figure 10:
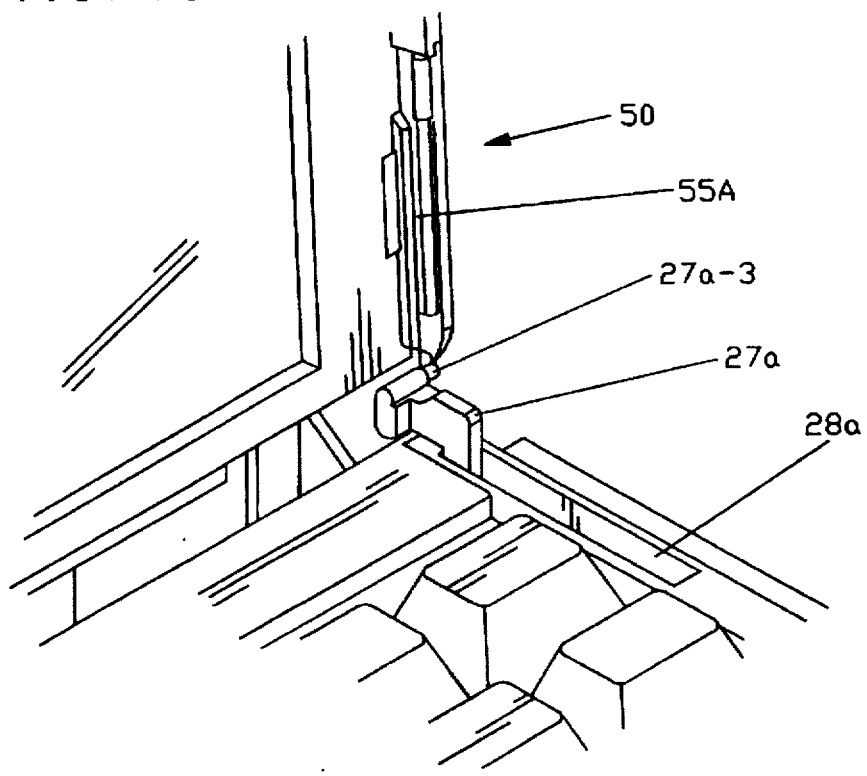
FIG. 10 is an enlarged perspective view of a groove a that is formed in the lower portion of the side wall of a bezel 53 that is the inner face of the lid 50.

As is shown in FIG. 7(b), at the distal end of the longer leg of the L-shaped lever 27a has a protrusion 27a-3 that extends toward the side. Further, though not shown, the lever 27b has the same protrusion 27b-3. Grooves 55a and 55b of a predetermined length are formed in the lower portions of the side walls of the bezel 53 on the inner face side of the lid 50, as is shown in FIG. 10. The grooves 55a and 55b are wide and deep enough to accept the protrusions 27a-3 and 27b-3 of the respective levers 27a and 27b. The grooves 55a and 55b may be corrugated components that are fitted into notches in the bezel 53.

FIGS. 11(a) through 11(d) are cross sectional views of the main body 10 and the hinged portion of lid 50 and are used to explain how the lever 27a is coupled with the groove 55a until the lid 50 is fully opened.

Figure 11A:
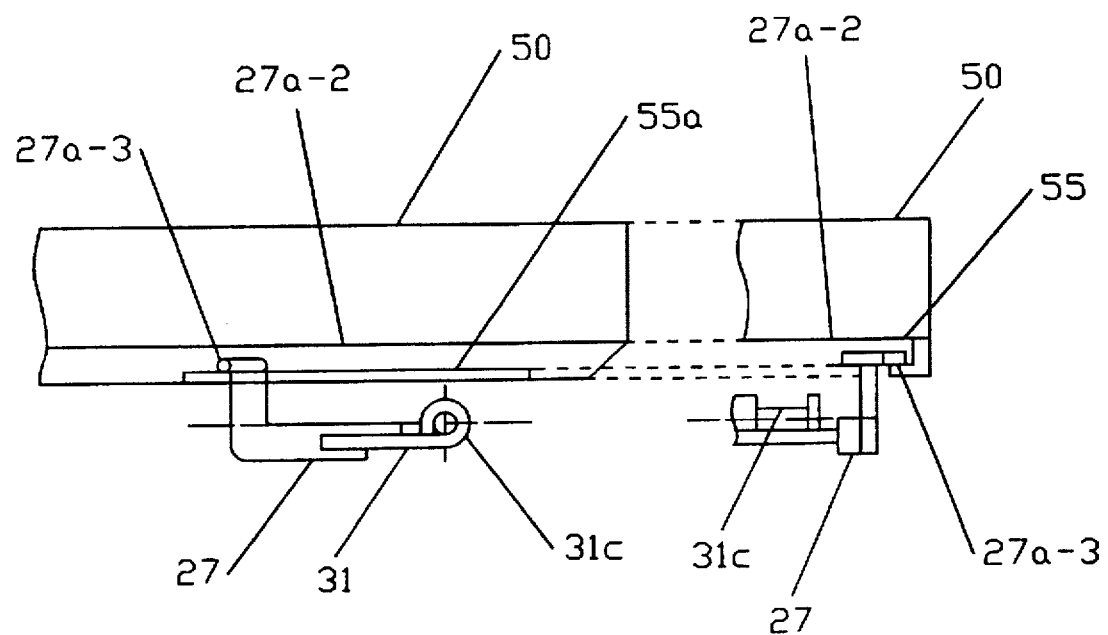
FIGS. 11(a)–11(d) are cross sectional view of the periphery of a main body 10 where it is coupled with the lid 50 by a hinge for explaining the relationship between the lever 27a and the groove a until the lid 50 is fully opened.

The left diagram in FIG. 11(a) is a cross sectional view taken along the direction toward the rear of the main body 10, and the right diagram is a cross sectional view taken along the width of the main body 10. As is shown in FIG. 11 (a), when the lid 50 is completely closed, the longer leg of the lever 27a (the foot plate 31) and the groove 55a are positioned horizontally. The protrusion 27a-3 is stored in the front portion of the groove 55a.

Figure 12:
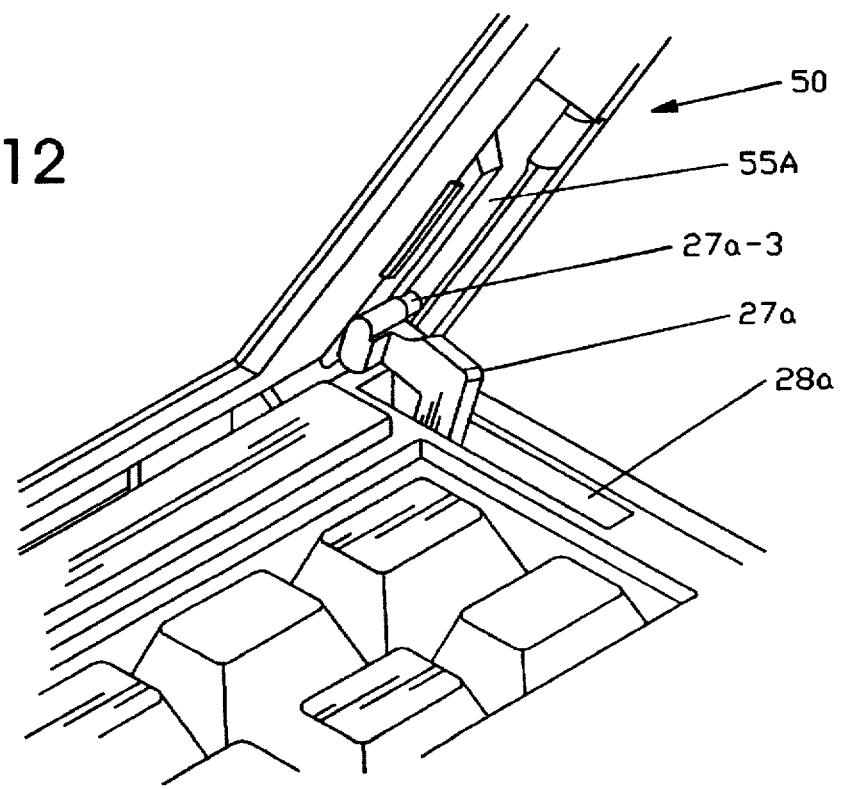
FIG. 12 is a front perspective view of the lid 50 when it is opened as wide as that in FIG. 11(c).
Figure 11B:
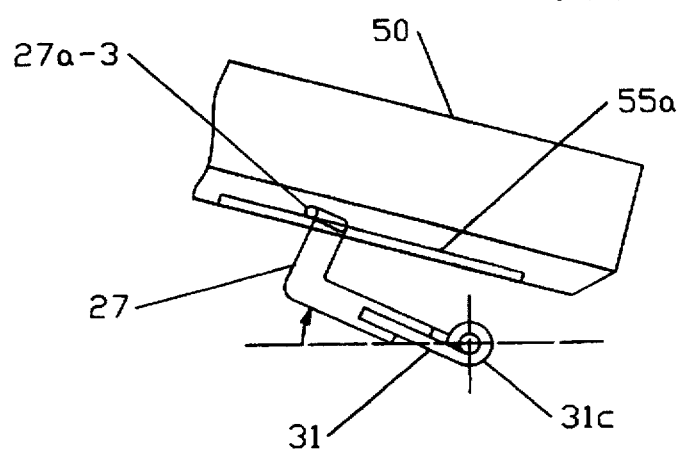
Figure 11C:
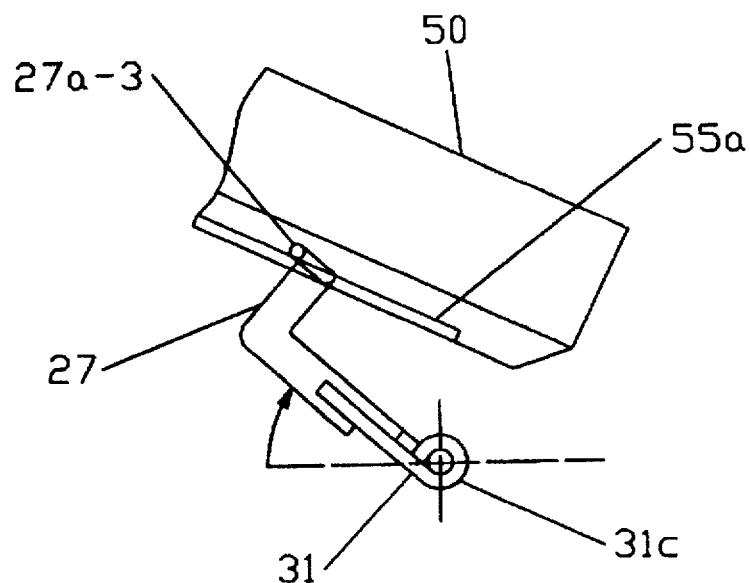

As the lid 50 is being opened, the groove 55a that is integrally formed in the lid 50 is gradually tilted, as is shown in FIGS. 11(b) and 11(c). While the protrusion 27a-3 slides rearward along the groove 55a, the lever 27a is pivoted clockwise and is raised. FIG. 12 is a front perspective view of the lid 50 when it is opened as wide as that in FIG. 11(c). As is shown in FIG. 12, the lever 27a is raised rearward of the main body 10 as the lid 50 is opened, while the keyboard portion 21 is tilted with the rear portion ascending.

Figure 11D:
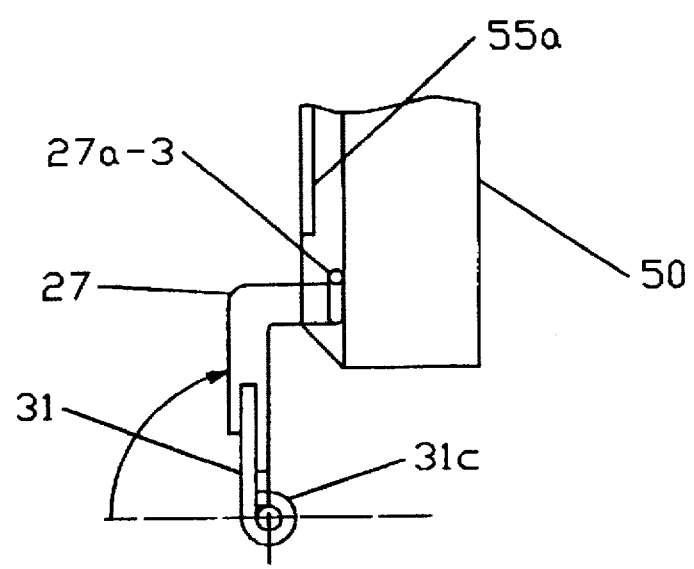

When the lid 50 is opened almost to 90 degrees, the protrusion 27a-3 is disengaged from the groove 55a, as is shown in FIG. 11(d). At this time, the lever 27a is almost upright, and already halts and holds the keyboard portion 21. FIG. 13 is a perspective front view of the lid 50 when it is opened at almost 90 degrees. As is shown in FIG. 13, the protrusion 27a-3 is disengaged from the rearmost end of the groove 55a. As the lid 50 continues to be opened, the protrusions 27a and 27b are completely released from the grooves 55a and 55b. With this structure, manually, the shorter legs of the levers 27a and 27b can be pushed forward to recline the keyboard portion 21. According to this manual operation, a user can fold, as desired, the tilted keyboard portion 21 by himself when the tilt of the keyboard has an adverse effect on the usability.

Since the lever 27b and the groove 55b correspond symmetrically to the lever 27a and the groove 55a, no explanation for them will be given.

When the lid 50 is opened with the keyboard portion 21 being tilted, the keyboard portion 21 may geometrically interfere with the movement of the lid 50. At the worst, the LCD panel 52 provided in the inner face of the lid 50 might strike the rear edge of the keyboard portion 21 and be damaged. Therefore, in the notebook PC 1 according to the present invention, the tilted keyboard portion 21 is automatically disengaged. The tilted keyboard portion 21 can be interlocked with the closing of the lid 50, and is returned to its original flat position by being interlocked with the closing of the lid 50.

A series of movements for releasing the keyboard portion 21 from the hold state involves the inverse performance of the procedures shown in FIG. 11 and in subdivision C. That is, as the lid 50 is gradually closed, the rear ends of the grooves 55a and 55b approach the protrusions 27a-3 and 27b-3 of the levers 27a and 27b in the still position. When the opening angle reaches a predetermined value (e.g., 90 degrees) or below, the protrusions 27a-3 and 27b-3 are engaged into the rear ends of the grooves 55a and 55b, as is shown in FIGS. 11(d) and 13.

When the lid 50 is being further closed, the protrusions 27a-3 and 27b-3 are inversely moved from FIG. 11(c) to FIG. 11(b), and slide forward along the grooves 55a and 55b. In accordance with this movement, the shorter legs of the levers 27a and 27b release the keyboard portion 21 from the rear portions of the holes 28a and 28b, and pivot down counterclockwise in FIG. 11. The keyboard portion 21 interlocks with this rotation and pivots down clockwise in FIG. 11. The front edge 31f of the foot plate 31 crosses over the slightly raised portion 21a again, and thus the hold state of the tilted keyboard portion 21 is released.

The lever 27a and the groove 55a lie flat when the lid 50 is fully closed. At this time, the protrusion 27a-3 is held at the front in the groove 55a. The keyboard portion 21 is returned to its original flat position. This condition is as is shown in FIG. 11(a).

In short, when the lid 50 is to be closed while the keyboard portion 21 is tilted, as is shown in FIG. 13, first, the distal ends of the levers 27a and 27b reach the side edge of the lid 50 and release the keyboard portion 21 from the hold state, so that the keyboard portion 21 begins to descend. Therefore, the keyboard portion 21 will not strike and damage the expensive LCD panel 52.

As is mentioned in subdivision A, since the pair of tongue pieces 29a and 29b of the keyboard base 23 are pivoted at the support plate 30, the keyboard unit 20 can be opened and closed relative to the main body case 11 around the axis C. When the keyboard unit 20 is opened additionally while the keyboard portion 21 is tilted, the keyboard portion 21 may geometrically interfere with the lid 50. At the worst, the LCD panel 52 provided on the inner face of the lid 50 will strike the keyboard portion 21 and be damaged.

In this embodiment, when the keyboard begins to open, the hold state is automatically released, and then the keyboard portion 21 is returned to its original flat position without damaging the LCD panel 52. The operation for releasing the keyboard portion 21 from the hold state will now be described in detail while referring to FIGS. 14(a) through 14(c).

Figure 14A:
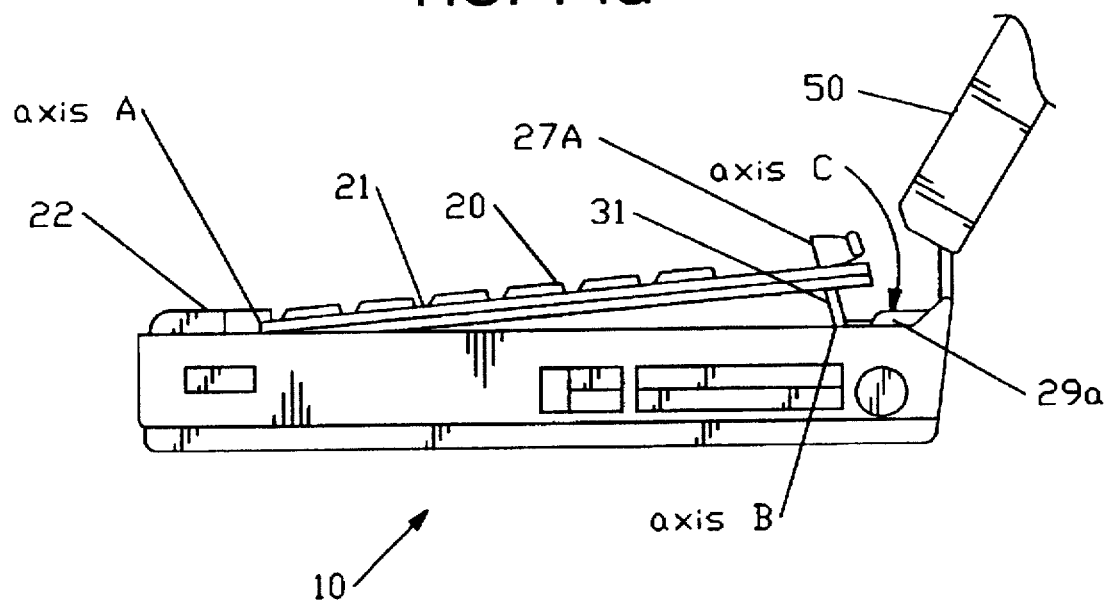
FIGS. 14(a)–14(c) are right side view of the lid 50 when it is opened further while the keyboard portion 21 is tilted.
Figure 14B:
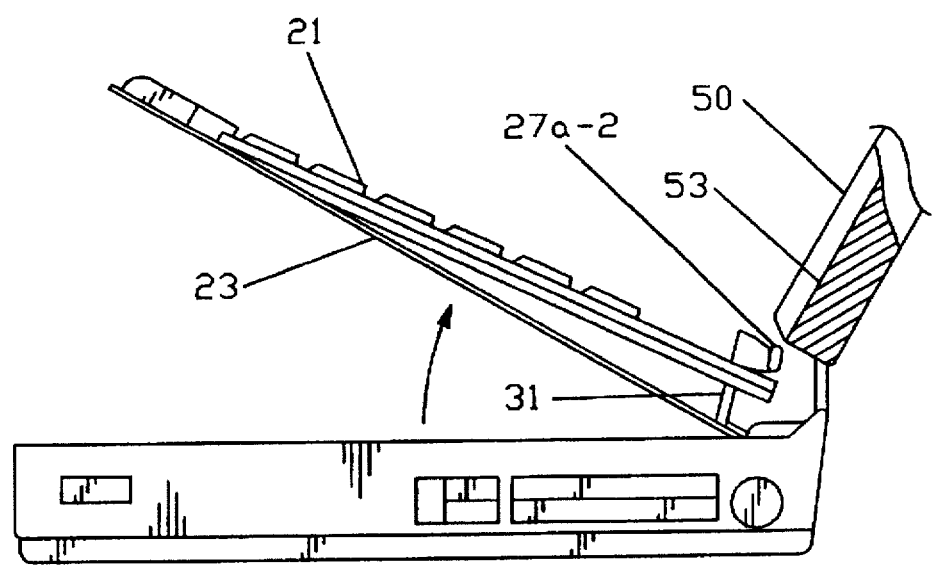
Figure 14C:
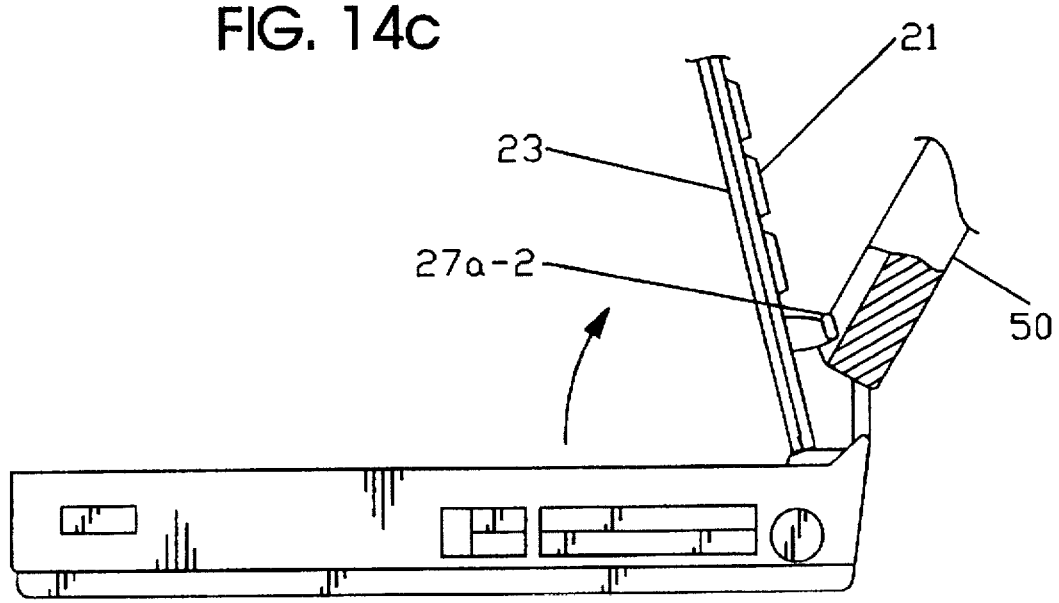

Suppose that the keyboard portion 21 is at the still position and the lid 50 is opened to about 120 degrees, as is shown in FIG. 14(a). When the keyboard base 23 is to be opened relative to the main body case 11, the head portions 27a-2 and 27b-2 of the levers 27a and 27b abut against the lower side edge of the bezel 53, as is shown in FIG. 14(b). When the keyboard base 23 is to be opened more widely, the levers 27a and 27b are pushed back to the front of the keyboard portion 21, and release the holding of the keyboard portion 21 at the holes 28a and 28b. Interlocking with this movement, the foot plate 31 that is integrally formed with the levers 27a and 27b slides the bottom surface of the keyboard base 23, and then the hold state of the keyboard portion 21 is released. As the keyboard base 23 is opened, the front edge 31f of the foot plate 31 crosses over the slightly raised portion 21a on the bottom surface of the keyboard portion 21 (not shown in FIG. 14), and the keyboard portion 21 finally descends on the keyboard base 23. The keyboard portion 21 that was supported by the foot plate 31 is also reclined flat on the keyboard base 23, as is shown in FIG. 14(c).

As is described above, the notebook PC 1 is so designed that the keyboard portion 21 is tilted, or is released from the hold state, by its movement interlocking with the opening and closing of the lid 50. This is proposed based on the empirical theory that a tilted keyboard provides better usability with less load be placed on the arms of a user. For some users who prefer the flat key top arrangement, the tilt of the keyboard portion is unwanted and rather adversely affects usability. Further, it is troublesome for a user to mutually release a keyboard portion from the hold state once it has been tilted.

According to another embodiment of the present invention, therefore, a mechanism for inhibiting the keyboard tilting operation is also included to respond to the demands from various users. The keyboard tilt inhibiting mechanism will be explained in detail while referring to FIGS. 15 through 18.

The mechanism for inhibiting the keyboard tilt is realized by a lever 27a and a stopper 35a for halting the movement of the lever 27a, shown in FIG. 15. The lever 27a in FIG. 15 is different from that in FIG. 4 in that a rail 27a-4 is formed at the upper edge of the longer leg. The rail 27a-4 has a thin sliding portion along which the stopper 35a can reciprocate; and thick front and rear ends that define the end positions for the movement of the stopper 35a. The stopper 35a has a groove 35a-1 at its lower half portion by which it is fitted around the rail 27a-4, and an operational portion 35a-2 at its upper half with which a user holds the stopper 35a and moves it back and forth.

Figure 16:
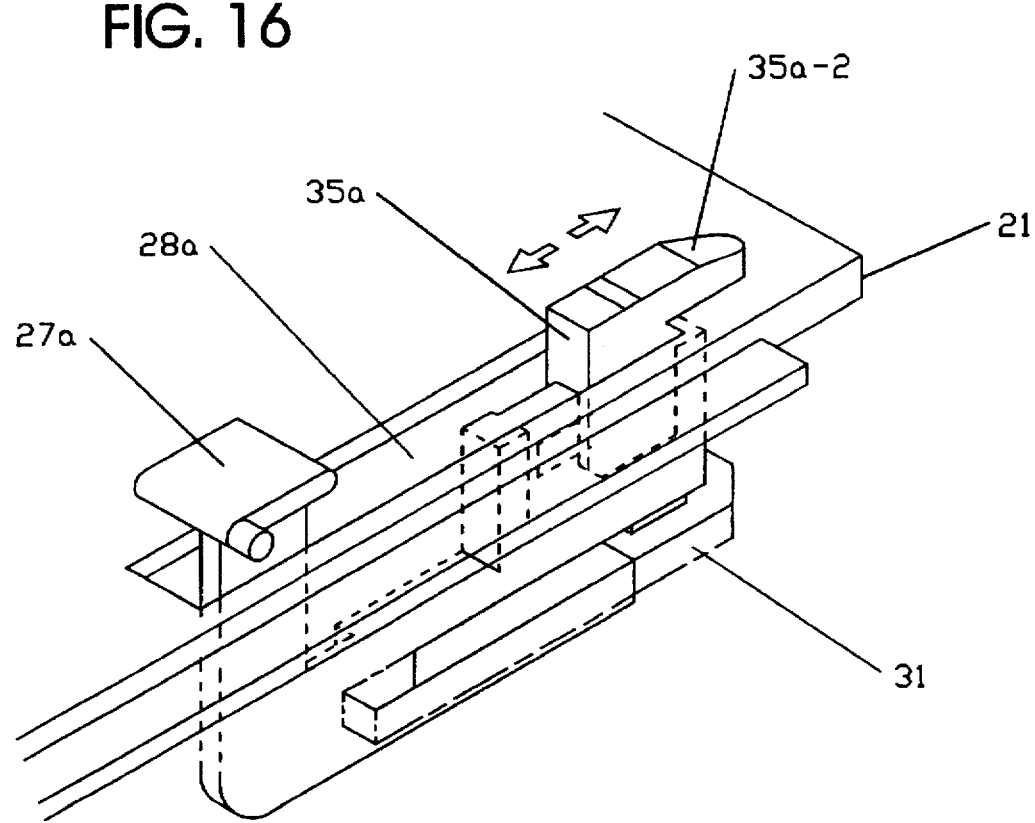
FIG. 16 is a diagram illustrating the lever 27a and the stopper 35a when they are installed in the keyboard unit 20.

In FIG. 16 is shown the lever 27a and the stopper 35a when they are assembled in the keyboard unit 20. The stopper 35a is attached, from above the hole 28a, to the lever 27a that is already assembled into the keyboard unit 20. The stopper 35a can be moved along the rail 27a-4 towards the front and towards the rear of the keyboard portion 21.

Figure 17:
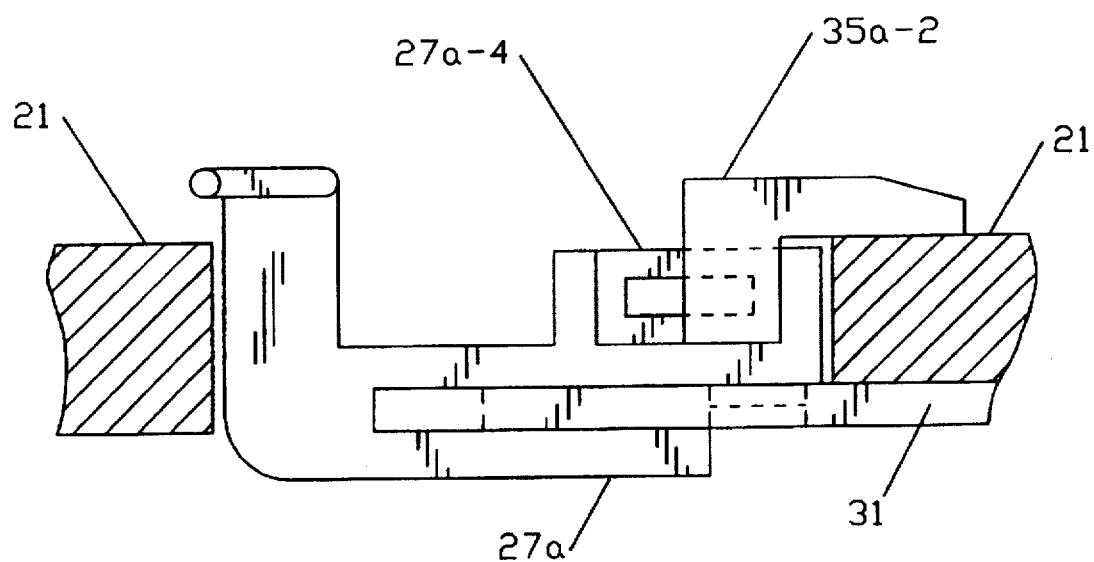

FIG. 17 is a cross sectional view of the keyboard unit 20 near the hole 28a. The stopper 35a is positioned at the rearmost position along the rail 27a-4. At this position, the distal end of the operational portion 35a-2 projects backward from the rear of the hole 28a. As is shown in FIG. 17, at the rear portion of the hole 28a, the keyboard portion 21 is held between the distal end of the operational portion 35a-2 and the foot plate 31, and the driving of the keyboard tilting mechanism is prevented. Hereafter, the condition where the stopper 35a is at the rearmost position is called a "keyboard tilt reserved state".

In FIG. 18 is shown the lever 27a and a groove a when a lid 50 is to be opened in the keyboard tilt reserved state.

Figure 18A:
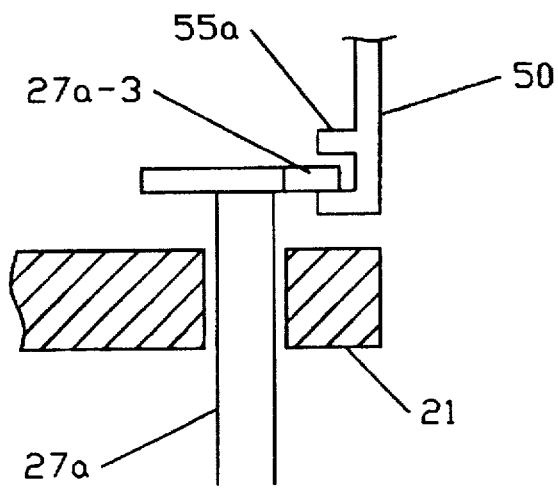
FIGS. 18(a)–18(c) are diagrams showing the lever 27a and the groove a when the lid 50 is to be opened in the keyboard tilt reserved state.

First, when the lid 50 is fully closed, a protrusion 27a-3 of the lever 27a is fitted into the groove a, as is shown in FIG. 18(a).

Figure 18B:
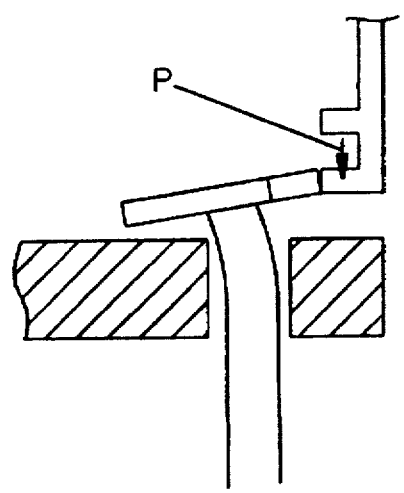

Then, when the lid 50 is to be opened, the lid 50 is halted by the protrusion 27a-3 fitted into the groove 55a. When the tilt of the keyboard portion 21 is not inhibited, the groove 55a is elevated together with the protrusion 27a-3. However, since, in the tilt reserved state, the tilt of the keyboard portion 21 is inhibited, resistance force P for preventing disengagement from the protrusion 27a-3 is applied at the groove 55a. In short, the resistance force P is a deformation force for bending inwardly the lever 27a. When a torque of a predetermined value or greater is applied to the lid 50, the lever 27a is bent inward and the protrusion 27a-3 is disengaged from the groove 55a, as is shown in FIG. 18(b).

Figure 18C:
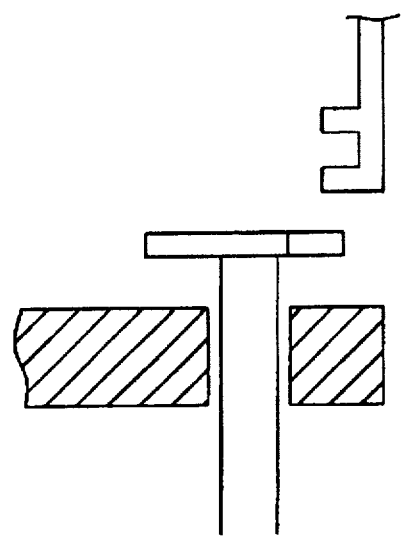

When the lid 50 is opened more widely, as is shown in FIG. 18(c), the protrusion 27a-3 is completely separated from the groove 55a, and the lever 27a is returned to its original shape.

When the lid 50 is closed again in the tilt reserved state, the lever 27a contacts the groove 55a and is bent inwardly and fitted into the groove 55a, and the lid 50 is closed. That is, the inverted procedures for FIGS. 18(c) to 18(b) to 18(a) are performed.

Although the diagrams and explanations for a lever 27b and a stopper 35b are not given, they are symmetrically formed with the lever 27a and the stopper 35a, respectively, and functions the same.

The present invention has been described in detail while referring to a specific embodiment. However, it should be obvious to one having ordinary skill in the art that various modifications or revisions of the embodiment are possible within the scope of the present invention. The present invention can be applied to any information processing apparatus having a lid, such as a word processor, wherein the lid, in which is included a liquid crystal display panel, is rotatably coupled at its rear edge by a hinge with a main body having a keyboard on its top surface. That is, although the present invention has been disclosed by using an example, it should not be limited to that example. To fully understand the subject of the present invention, the claims should be referred to.

As is described above in detail, according to the present invention, an excellent portable information processing apparatus is provided with a keyboard tilting mechanism that does not require extra space inside a PC main body, i.e., which does not degrade such structural features as compactness and thinness.

Further, according to the present invention, an excellent portable information processing apparatus is provided with a keyboard tilting mechanism that can disengage, as needed, the interlocking function that accompanies with the opening and closing of a lid.

In addition, according to the present invention, an excellent portable information processing apparatus is provided with a keyboard tilting mechanism that can eliminate a problem of electromagnetic interference at a PC main body when a keyboard portion is tilted.

Moreover, according to the present invention, a portable information processing apparatus is provided, wherein a keyboard unit provided on the top surface of a main body can be opened and closed, that has a keyboard tilting mechanism which, when a tilted keyboard portion is to be opened more widely, prevents a keyboard portion from geometrically interfering with a lid.

What is claimed is:

1. A portable information processing apparatus comprising:

(a) a main body, (b) a keyboard unit mounted on the top surface of said main body, (c) a lid pivotally attached to the rear end of said main body for covering said main body and keyboard unit, (d) a keyboard base of said keyboard unit for covering the top surface of said main body;

(e) a keyboard portion of said keyboard unit which is attached to the front end of said keyboard base, and which is rotatable in a first direction; and (d) a lever of said keyboard unit, which is attached to the rear end of said keyboard base, and which is rotatable in a second direction opposite to said first direction, for supporting said keyboard portion at a still position whereat said keyboard portion is tilted at a predetermined angle.

2. The portable information processing apparatus according to claim 1, wherein said keyboard portion is rotatable in said first direction in response to the rotation of said lever in said second direction.

3. The portable information processing apparatus according to claim 1, wherein said lever rotates in a direction opposite to said second direction while said lid is being closed.

4. The portable information processing apparatus according to claim 1, wherein said keyboard portion has a hole through which said lever is inserted, said lever is an L-shaped lever, said L-shaped lever has a longer leg rotatably attached to said keyboard base at the end thereof and slidably guided by said hole while said lever being rotating, and a shorter leg capable of supporting said keyboard portion at said still position by abutting against said keyboard portion.

5. The portable information processing apparatus according to claim 4, wherein said shorter leg of said L-Shaped lever has a head portion larger than said hole, a protrusion is formed at said head portion, and said lid has a groove by which said protrusion is guided.

6. The portable information processing apparatus according to claim 5, wherein said groove engages with the movement of said protrusion during a period beginning at a point where said lid is closed and continuing until immediately before said lid is fully open, and has an open end to release said protrusion outwardly once said lid is fully opened.

7. The portable information processing apparatus according to claim 6, wherein said lever is freely retracted downwardly while said protrusion is released from said groove.

8. The portable information processing apparatus according to claim 5, wherein said head portion of said lever abuts against said lid while said lid is being rotated from open position to closed position so that said keyboard portion is retracted from said still position.

9. The portable information processing apparatus according to claim 1, further comprising a foot plate for supporting said keyboard portion at said still position by abutting against the bottom side of said keyboard portion, said foot plate being integrally assembled with said lever and being moved up and down along with said lever.

10. A portable information processing apparatus comprising:

a main body, (b) a keyboard unit mounted on the top surface of said main body, (c) a lid pivotally attached to the rear end of said main body, (d) a keyboard base of said keyboard unit, which is pivotally attached to the rear end of main body, for covering the top surface of said main body;

(e) a keyboard portion of said keyboard unit which is attached to the front end of said keyboard base, and which is rotatable in a first direction; and (d) a lever of said keyboard unit, which is attached to the rear end of said keyboard base, and which is rotatable in a second direction opposite to said first direction, for holding said keyboard portion at a still position whereat said keyboard portion is tilted at a predetermined angle.

11. The portable information processing apparatus according to claim 10, wherein said lid is coupled to said lever to retract said lever downwardly in response to the opening operation of said keyboard unit against said main body.

12. The portable information processing apparatus according to claim 10, wherein said keyboard portion rotates in said first direction in response to the rotation of said lever in said second direction.

13. The portable information processing apparatus according to claim 10, wherein said lever rotates in a direction opposite to said second direction while said lid is being closed.

14. The portable information processing apparatus according to claim 10, wherein said keyboard portion has a hole through which said lever is inserted, said lever is an L-shaped lever, said L-shaped lever has a longer leg rotatably attached to said keyboard base at the end thereof and slidably guided by said hole while said lever being rotating, and a shorter leg capable of supporting said keyboard portion at said still position by abutting against said keyboard portion.

15. The portable information processing apparatus according to claim 14, wherein said shorter leg of said L-Shaped lever has a head portion larger than said hole, a protrusion is formed at said head portion, and said lid has a groove by which said protrusion is guided.

16. The portable information processing apparatus according to claim 15, wherein said groove engages with the movement of said protrusion during a period beginning at a point where said lid is closed and continuing until immediately before said lid is fully open, and has an open end to release said protrusion outwardly once said lid is fully opened.

17. The portable information processing apparatus according to claim 16, wherein said lever can be freely rotated down while said protrusion is released from said groove.

18. The portable information processing apparatus according to claim 15, wherein said head portion of said lever abuts against said lid while said keyboard unit is being opened so that said keyboard portion is retracted from said still portion.

19. The portable information processing apparatus according to claim 15, wherein said head portion of said lever abuts against said lid while said lid is being rotated from open position to closed position so that keyboard portion is retracted from said still position.

20. The portable information processing apparatus according to claim 10, further comprising a foot plate for supporting said keyboard portion at said still position by abutting against the bottom side of said keyboard portion, said foot plate being integrally assembled with said lever and being moved up and down along with said lever.

21. The portable information processing apparatus according to claim 10, wherein said lid has a liquid crystal display panel almost in the center of an inner face.

22. The portable information processing apparatus according to claim 10, wherein said keyboard base is made of material for absorbing electromagnetic waves.

* * * * *